US012641219B2

(12) United States Patent
Heo et al.

(10) Patent No.: US 12,641,219 B2
(45) Date of Patent: May 26, 2026

(54) VIDEO ENCODING/DECODING METHOD AND APPARATUS FOR CONSTRUCTING MERGE CANDIDATE LIST BY GENERATING PAIRWISE MERGE CANDIDATES

(71) Applicants: HYUNDAI MOTOR COMPANY, Seoul (KR); KIA CORPORATION, Seoul (KR)

(72) Inventors: Jin Heo, Yongin-si (KR); Seung Wook Park, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/762,319

(22) Filed: Jul. 2, 2024

(65) Prior Publication Data

US 2024/0357086 A1 Oct. 24, 2024

Related U.S. Application Data

(63) Continuation of application No. PCT/KR2023/000131, filed on Jan. 4, 2023.

(30) Foreign Application Priority Data

Jan. 4, 2022 (KR) ........................ 10-2022-0000970
Dec. 30, 2022 (KR) ........................ 10-2022-0190778

(51) Int. Cl.
*H04N 19/105* (2014.01)
*H04N 19/139* (2014.01)
*H04N 19/176* (2014.01)

(52) U.S. Cl.
CPC ......... *H04N 19/105* (2014.11); *H04N 19/139* (2014.11); *H04N 19/176* (2014.11)

(58) Field of Classification Search
None
See application file for complete search history.

(56) References Cited

U.S. PATENT DOCUMENTS 11,202,081 B2 12/2021 Zhang
11,509,915 B2 11/2022 Zhang
(Continued)

FOREIGN PATENT DOCUMENTS

KR 20200094788 A 8/2020
WO 2020182147 A1 9/2020
WO 2021172881 A1 9/2021

OTHER PUBLICATIONS

International Search Report and Written Opinion cited in corresponding international patent application No. PCT/KR2023/000131; Apr. 24, 2023; 10 pp.

*Primary Examiner* — Christopher G Findley
(74) *Attorney, Agent, or Firm* — Lempia Summerfield Katz LLC

(57) ABSTRACT

A method and an apparatus for encoding/decoding a video are provided. A method for decoding a video includes generating one or more spatial merging candidates, generating a temporal merging candidate. The method also includes generating one or more history-based motion vector prediction candidates. The method also includes generating a first merging candidate list based on the one or more spatial merging candidates, the temporal merging candidates, and the one or more history-based motion vector prediction candidates. The method also includes generating one or more pairwise average merging candidates when the first merging candidate list is not fulfilled with merging candidates. The method also includes generating a second merging candidate list based on the one or more pairwise average merging candidates and the first merging candidate list. The (Continued)

method also includes generating a prediction block of the current block based on the second merging candidate list.

9 Claims, 18 Drawing Sheets

(56)                    References Cited

U.S. PATENT DOCUMENTS

| | | | |
|---|---|---|---|
| 11,523,123 B2 | 12/2022 | Zhang | |
| 11,558,632 B2 | 1/2023 | Solovyev | |
| 11,831,884 B2 | 11/2023 | Zhang | |
| 11,924,406 B2 | 3/2024 | Zhao | |
| 11,973,962 B2 | 4/2024 | Zhang | |
| 2020/0396465 A1 | 12/2020 | Zhang | |
| 2020/0404254 A1* | 12/2020 | Zhao | H04N 19/70 |
| 2020/0404255 A1 | 12/2020 | Zhang | |
| 2020/0404260 A1 | 12/2020 | Zhang | |
| 2020/0413048 A1 | 12/2020 | Zhang | |
| 2021/0006780 A1 | 1/2021 | Zhang | |
| 2021/0203958 A1 | 7/2021 | Zhang | |
| 2021/0281870 A1 | 9/2021 | Solovyev | |
| 2021/0392341 A1 | 12/2021 | Zhang | |
| 2022/0078452 A1 | 3/2022 | Zhang | |
| 2022/0217363 A1 | 7/2022 | Zhang | |
| 2023/0082043 A1 | 3/2023 | Hendry | |
| 2023/0115768 A1* | 4/2023 | Liao | H04N 19/105 |
| | | | 375/240.02 |
| 2023/0125381 A1 | 4/2023 | Solovyev | |
| 2024/0121410 A1 | 4/2024 | Zhang | |

* cited by examiner

Template Matching–Based
Merge Candidate Reordering

| Merge Index | L0 | L1 |
|---|---|---|
| 0 | A0 | A1 |
| 1 | B0 | B1 |
| 2 | C0 | C1 |
| 3 | | |
| 4 | | |
| 5 | | |

| Merge Index | L0 | L1 |
|---|---|---|
| 1 | C0 | C1 |
| 2 | A0 | A1 |
| 3 | B0 | B1 |
| 4 | | |
| 5 | | |
| 6 | | |

| Pairwise1 | L0 | L1 |
|---|---|---|
| MV | (C0+A0)/2 | (C1+A1)/2 |
| refIdx | refIdx of C0 | refIdx of C1 |

| Pairwise2 | L0 | L1 |
|---|---|---|
| MV | (C0+B0)/2 | (C1+B1)/2 |
| refIdx | refIdx of C0 | refIdx of C1 |

| Pairwise3 | L0 | L1 |
|---|---|---|
| MV | (A0+B0)/2 | (A1+B1)/2 |
| refIdx | refIdx of A0 | refIdx of A1 |

VIDEO ENCODING/DECODING METHOD AND APPARATUS FOR CONSTRUCTING MERGE CANDIDATE LIST BY GENERATING PAIRWISE MERGE CANDIDATES

CROSS-REFERENCE TO RELATED APPLICATIONS

This application is a Continuation of International Application No. PCT/KR2023/000131, filed on Jan. 4, 2023, which claims under 35 U.S.C. § 119 (a) priority to and the benefit of Korean Patent Application No. 10-2022-0000970 filed on Jan. 4, 2022, and Korean Patent Application No. 10-2022-0190778 filed on Dec. 30, 2022, the entire disclosures of each of which are incorporated herein by reference.

TECHNICAL FIELD

The present disclosure relates to a video encoding/decoding method and a video encoding/decoding apparatus, and more particularly, to a video encoding/decoding method and a video encoding/decoding apparatus for generating merging candidates.

BACKGROUND

The statements in this section merely provide background information related to the present disclosure and do not necessarily constitute prior art.

Since the volume of video data is larger than the volume of voice data or still image data, storing or transmitting video data without processing the video data by compression requires a lot of hardware resources including memory.

Accordingly, in storing or transmitting video data, the video data is generally compressed using an encoder so as to be stored or transmitted. Then, a decoder receives the compressed video data and decompresses and reproduces the video data. Compression techniques for such video include H.264/Advanced Video Coding (AVC), high efficiency video coding (HEVC), and versatile video coding (VVC), which improves coding efficiency by about 30% or more compared to HEVC.

However, the video size, resolution, and frame rate are gradually increasing, and thus the amount of data to be encoded is also increasing. Accordingly, a new compression technique having better encoding efficiency and higher image quality than the existing compression technique is required.

Inter prediction refers to generating a prediction block of the current block from a picture coded at a previous time. Merge mode is a technique that derives the reference direction, reference picture index, and motion vector prediction values from neighboring blocks. In inter prediction, a merging candidate list is composed, and among the composed merging candidate list, a specific candidate indicated by a transmitted index has motion information that is used as the motion information of the current block. Using that motion information, motion compensation is performed, and the prediction block of the current block is generated. When composing the merging candidate list, the merging candidates need to be organized efficiently to improve coding efficiency.

SUMMARY

Objects of the present disclosure are to provide a method and an apparatus for efficiently composing a merging candidate list.

Other objects of the present disclosure are to provide a method and an apparatus for generating pairwise average merging candidates by using template matching.

Other objects of the present disclosure are to provide a method and an apparatus for limiting the number of zero-motion vector merging candidates.

Other objects of the present disclosure are to provide a method and an apparatus for improving video encoding/decoding efficiency.

Another object of the present disclosure is to provide a recording medium storing a bitstream generated by a video encoding/decoding method or a video encoding/decoding apparatus of the present disclosure.

Other objects of the present disclosure are to provide a method and an apparatus for transmitting a bitstream generated by a video encoding/decoding method or an apparatus of the present disclosure.

According to an embodiment of the present disclosure, a video decoding method includes generating one or more spatial merging candidates based on neighboring blocks that are spatially adjacent to a current block and generating a temporal merging candidate based on neighboring blocks that are temporally adjacent to the current block. The method also includes generating one or more history-based motion vector prediction candidates based on motion information of a block encoded before the current block. The method also includes generating a first merging candidate list based on the one or more spatial merging candidates, the temporal merging candidates, and the one or more history-based motion vector prediction candidates. The method also includes generating one or more pairwise average merging candidates when the first merging candidate list is not fulfilled with merging candidates. They method also includes generating a second merging candidate list based on the one or more pairwise average merging candidates and the first merging candidate list and generating a prediction block of the current block based on the second merging candidate list.

According to an embodiment of the present disclosure, a video encoding method includes generating one or more spatial merging candidates based on neighboring blocks that are spatially adjacent to a current block and generating a temporal merging candidate based on neighboring blocks that are temporally adjacent to the current block. The method also includes generating one or more history-based motion vector prediction candidates based on motion information of a block encoded before the current block. The method also includes generating a first merging candidate list based on the one or more spatial merging candidates, the temporal merging candidates, and the one or more history-based motion vector prediction candidates. The method also includes generating one or more pairwise average merging candidates when the first merging candidate list is not fulfilled with merging candidates. The method also includes generating a second merging candidate list based on the one or more pairwise average merging candidates and the first merging candidate list and generating a prediction block of the current block based on the second merging candidate list.

In addition, according to an embodiment of the present disclosure, it is possible to provide a method of transmitting a bitstream generated by the video encoding method or apparatus according to the present disclosure.

In addition, according to an embodiment of the present disclosure, it is possible to provide a recording medium storing a bitstream generated by the video encoding method or apparatus according to the present disclosure.

In addition, according to an embodiment of the present disclosure, it is possible to provide a recording medium storing a bitstream received and decoded by the video decoding apparatus according to the present disclosure and used to reconstruct a video.

According to an embodiment of the present disclosure, a method and an apparatus for efficiently composing a merging candidate list may be provided.

In addition, according to an embodiment of the present disclosure, a method and an apparatus for generating pairwise average merging candidates by using template matching may be provided.

In addition, according to an embodiment of the present disclosure, a method and an apparatus for limiting the number of zero-motion vector merging candidates may be provided.

In addition, according to an embodiment of the present disclosure, a method and an apparatus for improving video encoding/decoding efficiency may be provided.

The effects that may be obtained from the present disclosure are not limited to the effects mentioned above, and other effects not mentioned may be clearly understood by those having ordinary skill in the art from the description below.

BRIEF DESCRIPTION OF THE DRAWINGS

FIG. 15 is a diagram illustrating a method of generating pairwise average merging candidates, according to yet another embodiment of the present disclosure.

Figure 1:
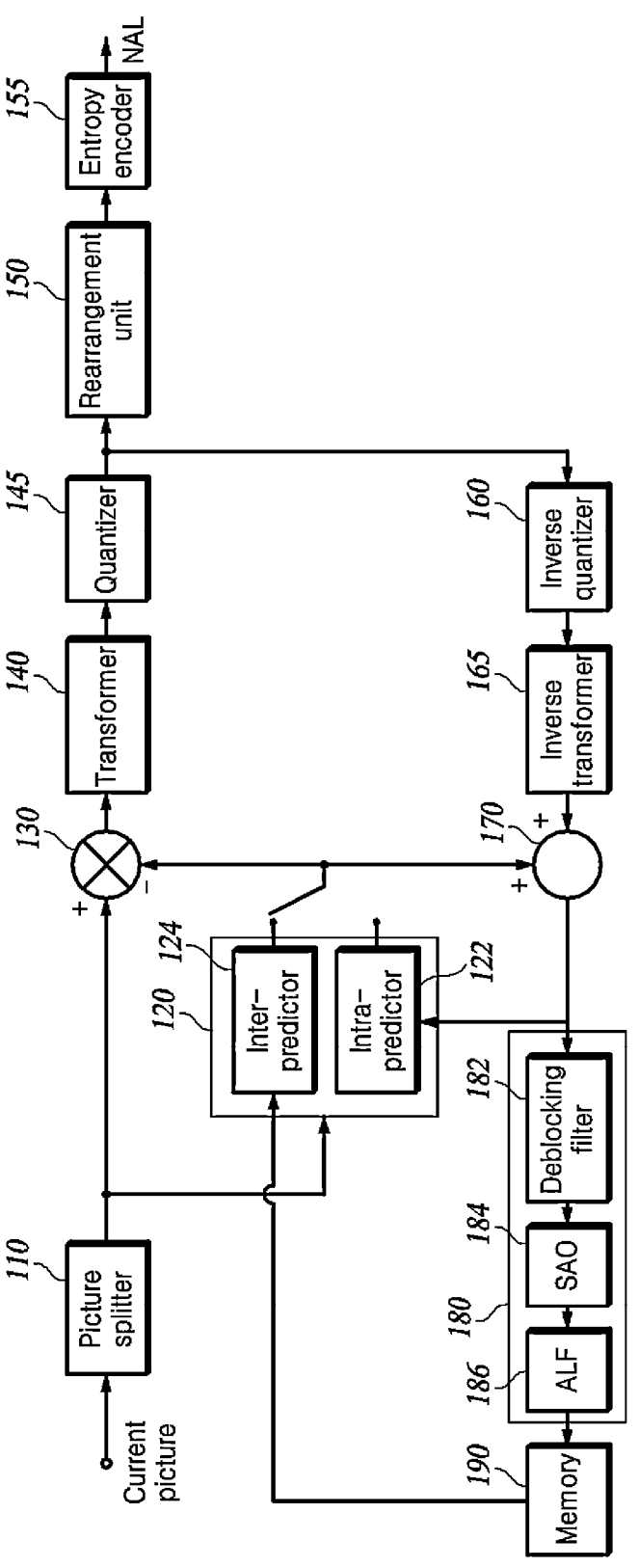
FIG. 1 is a block diagram of a video encoding apparatus that may implement a technology of the present disclosure.

The drawings described herein are for illustration purpose only and are not intended to limit the scope of the present disclosure in any way.

DETAILED DESCRIPTION

Hereinafter, some embodiments of the present disclosure are described in detail with reference to the accompanying illustrative drawings. In the following description, like reference numerals designate like elements, although the elements are shown in different drawings. Further, in the following description of some embodiments, detailed descriptions of related known components and functions when considered to obscure the subject of the present disclosure have been omitted for the purpose of clarity and for brevity.

FIG. 1 is a block diagram of a video encoding apparatus according to an embodiment of the present disclosure. The video encoding apparatus may implement technologies or methods according to one or more embodiments of the present disclosure. Hereinafter, referring to FIG. 1, the video encoding apparatus and components of the apparatus are described.

The encoding apparatus may include a picture splitter 110, a predictor 120, a subtractor 130, a transformer 140, a quantizer 145, a rearrangement unit 150, an entropy encoder 155, an inverse quantizer 160, an inverse transformer 165, an adder 170, a loop filter unit 180, and a memory 190.

Each component of the encoding apparatus may be implemented as hardware or software or implemented as a combination of hardware and software. Further, a function of each component may be implemented as software, and a microprocessor may also be implemented to execute the function of the software corresponding to each component.

One video is constituted by one or more sequences including a plurality of pictures. Each picture is split into a plurality of areas, and encoding is performed for each area. For example, one picture is split into one or more tiles or/and slices. One or more tiles may be defined as a tile group. Each tile or/and slice is split into one or more coding tree units (CTUs). In addition, each CTU is split into one or more coding units (CUs) by a tree structure. Information applied to each CU is encoded as a syntax of the CU and information commonly applied to the CUs included in one CTU is encoded as the syntax of the CTU. Further, information commonly applied to all blocks in one slice is encoded as the syntax of a slice header, and information applied to all blocks constituting one or more pictures is encoded to a picture parameter set (PPS) or a picture header. Furthermore, information, which the plurality of pictures commonly refers to, is encoded to a sequence parameter set (SPS). In addition, information, which one or more SPS commonly refer to, is encoded to a video parameter set (VPS). Further, information commonly applied to one tile or tile group may also be encoded as the syntax of a tile or tile group header. The syntaxes included in the SPS, the PPS, the slice header, the tile, or the tile group header may be referred to as a high level syntax.

The picture splitter 110 determines a size of a coding tree unit (CTU). Information on the size of the CTU (CTU size)

is encoded as the syntax of the SPS or the PPS and delivered to a video decoding apparatus.

The picture splitter 110 splits each picture constituting the video into a plurality of coding tree units (CTUs) having a predetermined size and then recursively splits the CTU by using a tree structure. A leaf node in the tree structure becomes the coding unit (CU), which is a basic unit of encoding.

The tree structure may be a quadtree (QT) in which a higher node (or a parent node) is split into four lower nodes (or child nodes) having the same size. The tree structure may also be a binarytree (BT) in which the higher node is split into two lower nodes. The tree structure may also be a ternarytree (TT) in which the higher node is split into three lower nodes at a ratio of 1:2:1. The tree structure may also be a structure in which two or more structures among the QT structure, the BT structure, and the TT structure are mixed. For example, a quadtree plus binarytree (QTBT) structure may be used or a quadtree plus binarytree ternarytree (QTBTTT) structure may be used. In this example, a binarytree ternarytree (BTTT) is added to the tree structures to be referred to as a multiple-type tree (MTT).

Figure 2:
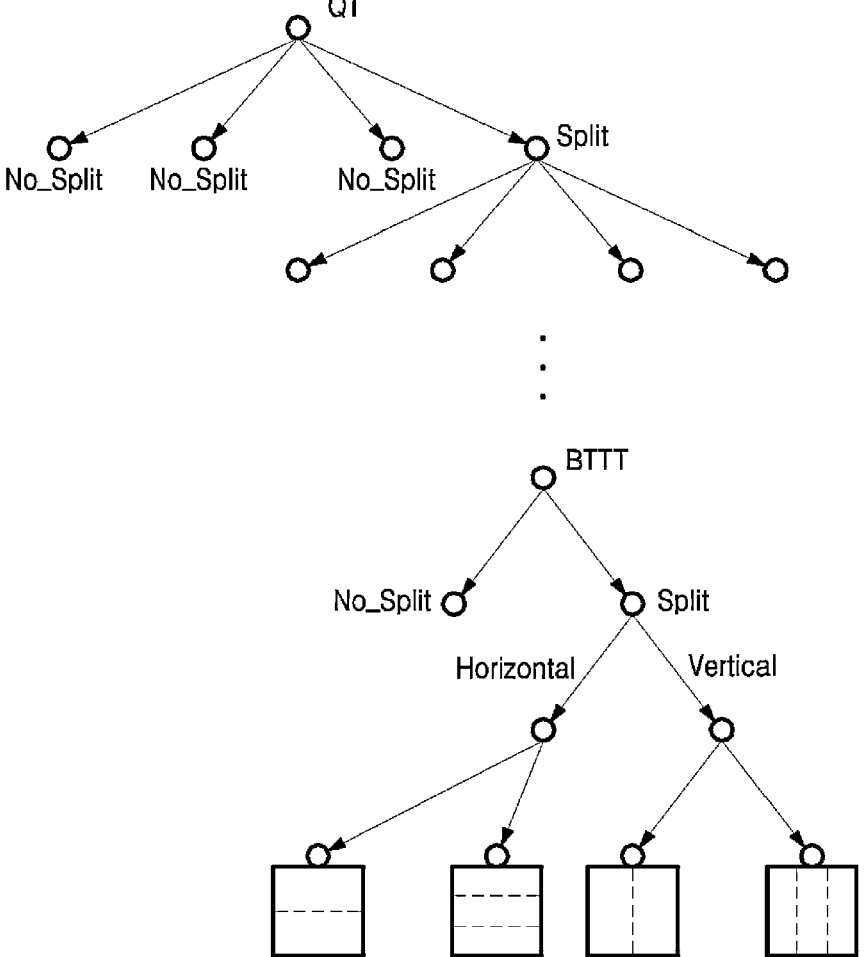
FIG. 2 illustrates a method for partitioning a block using a quadtree plus binarytree ternarytree (QTBTTT) structure.

FIG. 2 is a diagram for describing a method for splitting a block by using a QTBTTT structure according to an embodiment of the present disclosure.

As illustrated in FIG. 2, the CTU may first be split into the QT structure. Quadtree splitting may be recursive until the size of a splitting block reaches a minimum block size (MinQTSize) of the leaf node permitted in the QT. A first flag (QT_split_flag) indicating whether each node of the QT structure is split into four nodes of a lower layer is encoded by the entropy encoder 155 and signaled to the video decoding apparatus. When the leaf node of the QT is not larger than a maximum block size (MaxBTSize) of a root node permitted in the BT, the leaf node may be further split into at least one of the BT structure or the TT structure. A plurality of split directions may be present in the BT structure and/or the TT structure. For example, there may be two directions, i.e., a direction in which the block of the corresponding node is split horizontally and a direction in which the block of the corresponding node is split vertically. As illustrated in FIG. 2, when the MTT splitting starts, a second flag (mtt_split_flag) indicating whether the nodes are split, and a flag additionally indicating the split direction (vertical or horizontal), and/or a flag indicating a split type (binary or ternary) if the nodes are split are encoded by the entropy encoder 155 and signaled to the video decoding apparatus.

Alternatively, prior to encoding the first flag (QT_split_flag) indicating whether each node is split into four nodes of the lower layer, a CU split flag (split_cu_flag) indicating whether the node is split may also be encoded. When a value of the CU split flag (split_cu_flag) indicates that each node is not split, the block of the corresponding node becomes the leaf node in the split tree structure and becomes the CU, which is the basic unit of encoding. When the value of the CU split flag (split_cu_flag) indicates that each node is split, the video encoding apparatus starts encoding the first flag first by the above-described scheme.

When the QTBT is used as another example of the tree structure, there may be two types, i.e., a type (i.e., symmetric horizontal splitting) in which the block of the corresponding node is horizontally split into two blocks having the same size and a type (i.e., symmetric vertical splitting) in which the block of the corresponding node is vertically split into two blocks having the same size. A split flag (split_flag) indicating whether each node of the BT structure is split into the block of the lower layer and split type information indicating a splitting type are encoded by the entropy encoder 155 and delivered to the video decoding apparatus. A type in which the block of the corresponding node is split into two blocks of a form of being asymmetrical to each other may be additionally present. The asymmetrical form may include a form in which the block of the corresponding node is split into two rectangular blocks having a size ratio of 1:3 or may also include a form in which the block of the corresponding node is split in a diagonal direction.

The CU may have various sizes according to QTBT or QTBTTT splitting from the CTU. Hereinafter, a block corresponding to a CU (i.e., the leaf node of the QTBTTT) to be encoded or decoded is referred to as a "current block." As the QTBTTT splitting is adopted, a shape of the current block may also be a rectangular shape in addition to a square shape.

The predictor 120 predicts the current block to generate a prediction block. The predictor 120 includes an intra predictor 122 and an inter predictor 124.

In general, each of the current blocks in the picture may be predictively coded. In general, the prediction of the current block may be performed by using an intra prediction technology (using data from the picture including the current block) or an inter prediction technology (using data from a picture coded before the picture including the current block). The inter prediction includes both unidirectional prediction and bidirectional prediction.

Figure 3A:
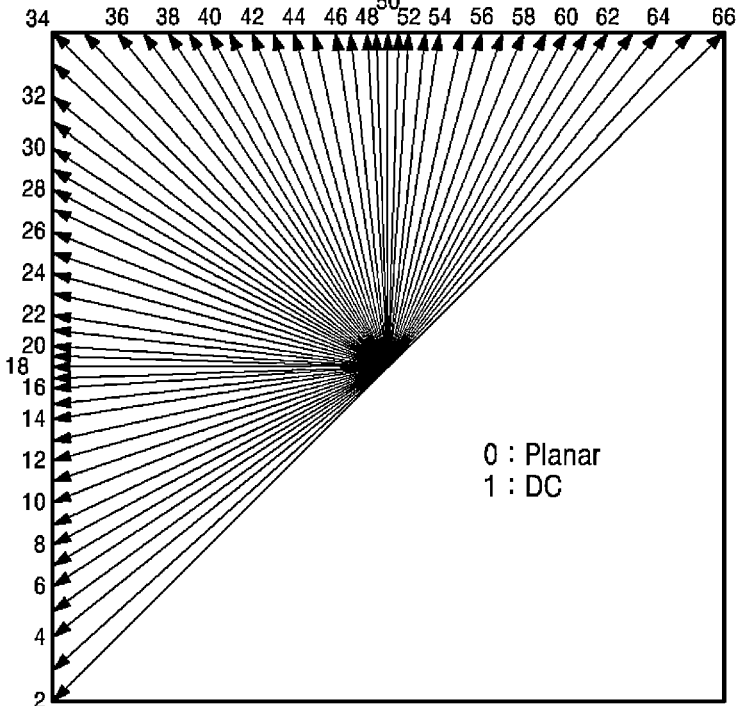
FIGS. 3A and 3B illustrate a plurality of intra prediction modes including wide-angle intra prediction modes.

The intra predictor 122 predicts pixels in the current block by using pixels (reference pixels) positioned on a neighbor of the current block in the current picture including the current block. There is a plurality of intra prediction modes according to the prediction direction. For example, as illustrated in FIG. 3A, the plurality of intra prediction modes may include 2 non-directional modes including a Planar mode and a direct current (DC) mode and may include 65 directional modes. A neighboring pixel and an arithmetic equation to be used are defined differently according to each prediction mode.

Figure 3B:
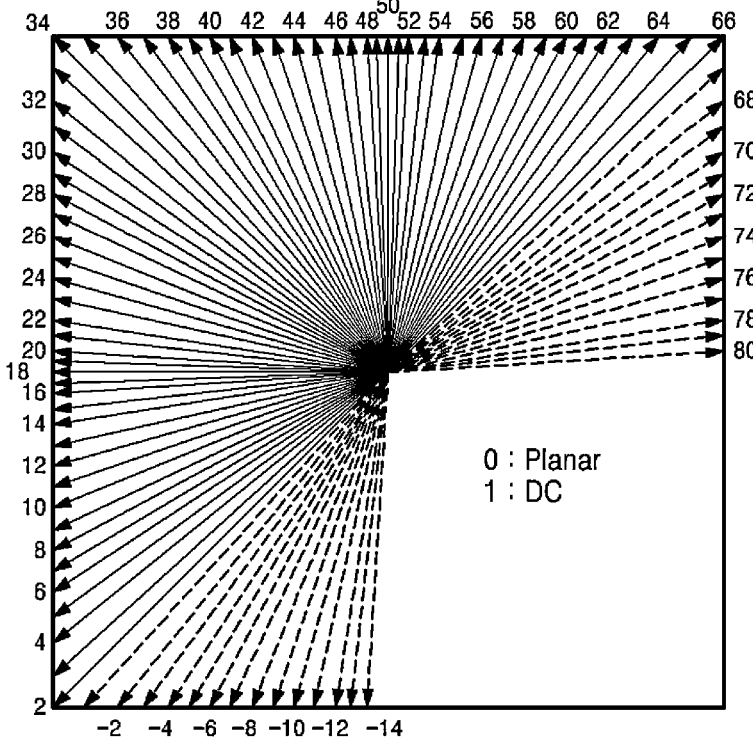

For efficient directional prediction for the current block having a rectangular shape, directional modes (#67 to #80, intra prediction modes #−1 to #−14) illustrated as dotted arrows in FIG. 3B may be additionally used. The directional modes may be referred to as "wide angle intra-prediction modes". In FIG. 3B, the arrows indicate corresponding reference samples used for the prediction and do not represent the prediction directions. The prediction direction is opposite to a direction indicated by the arrow. When the current block has the rectangular shape, the wide angle intra-prediction modes are modes in which the prediction is performed in an opposite direction to a specific directional mode without additional bit transmission. In this example, among the wide angle intra-prediction modes, some wide angle intra-prediction modes usable for the current block may be determined by a ratio of a width and a height of the current block having the rectangular shape. For example, when the current block has a rectangular shape in which the height is smaller than the width, wide angle intra-prediction modes (intra prediction modes #67 to #80) having an angle smaller than 45 degrees are usable. When the current block has a rectangular shape in which the width is larger than the height, the wide angle intra-prediction modes having an angle larger than −135 degrees are usable.

The intra predictor 122 may determine an intra prediction to be used for encoding the current block. In some examples, the intra predictor 122 may encode the current block by using multiple intra prediction modes and also select an appropriate intra prediction mode to be used from tested modes. For example, the intra predictor 122 may calculate rate-distortion values by using a rate-distortion analysis for multiple tested intra prediction modes and also select an intra prediction mode having best rate-distortion features among the tested modes.

The intra predictor 122 selects one intra prediction mode among a plurality of intra prediction modes and predicts the current block by using a neighboring pixel (reference pixel) and an arithmetic equation determined according to the selected intra prediction mode. Information on the selected intra prediction mode is encoded by the entropy encoder 155 and delivered to the video decoding apparatus.

The inter predictor 124 generates the prediction block for the current block by using a motion compensation process. The inter predictor 124 searches a block most similar to the current block in a reference picture encoded and decoded earlier than the current picture and generates the prediction block for the current block by using the searched block. In addition, a motion vector (MV) is generated, which corresponds to a displacement between the current bock in the current picture and the prediction block in the reference picture. In general, motion estimation is performed for a luma component, and a motion vector calculated based on the luma component is used for both the luma component and a chroma component. Motion information including information on the reference picture and information on the motion vector used for predicting the current block is encoded by the entropy encoder 155 and delivered to the video decoding apparatus.

The inter predictor 124 may also perform interpolation for the reference picture or a reference block in order to increase accuracy of the prediction. In other words, sub-samples between two contiguous integer samples are interpolated by applying filter coefficients to a plurality of contiguous integer samples including two integer samples. When a process of searching a block most similar to the current block is performed for the interpolated reference picture, not integer sample unit precision but decimal unit precision may be expressed for the motion vector. Precision or resolution of the motion vector may be set differently for each target area to be encoded, e.g., a unit such as the slice, the tile, the CTU, the CU, and the like. When such an adaptive motion vector resolution (AMVR) is applied, information on the motion vector resolution to be applied to each target area should be signaled for each target area. For example, when the target area is the CU, the information on the motion vector resolution applied for each CU is signaled. The information on the motion vector resolution may be information representing precision of a motion vector difference to be described below.

The inter predictor 124 may perform inter prediction by using bi-prediction. With regard to bi-prediction, two reference pictures and two motion vectors representing a block position most similar to the current block in each reference picture are used. The inter predictor 124 selects a first reference picture and a second reference picture from reference picture list 0 (RefPicList0) and reference picture list 1 (RefPicList1), respectively. The inter predictor 124 also searches blocks most similar to the current blocks in the respective reference pictures to generate a first reference block and a second reference block. In addition, the prediction block for the current block is generated by averaging or weighted-averaging the first reference block and the second reference block. In addition, motion information including information on two reference pictures used for predicting the current block and information on two motion vectors is delivered to the entropy encoder 155. In this example, reference picture list 0 may be constituted by pictures before the current picture in a display order among pre-reconstructed pictures, and reference picture list 1 may be constituted by pictures after the current picture in the display order among the pre-reconstructed pictures. However, although not particularly limited thereto, the pre-reconstructed pictures after the current picture in the display order may be additionally included in reference picture list 0. Inversely, the pre-reconstructed pictures before the current picture may also be additionally included in reference picture list 1.

In order to minimize a bit quantity consumed for encoding the motion information, various methods may be used.

For example, when the reference picture and the motion vector of the current block are the same as the reference picture and the motion vector of the neighboring block, information capable of identifying the neighboring block is encoded to deliver the motion information of the current block to the video decoding apparatus. Such a method may be referred to as a merge mode.

In the merge mode, the inter predictor 124 selects a predetermined number of merge candidate blocks (hereinafter, referred to as a "merge candidate") from the neighboring blocks of the current block.

Figure 4:
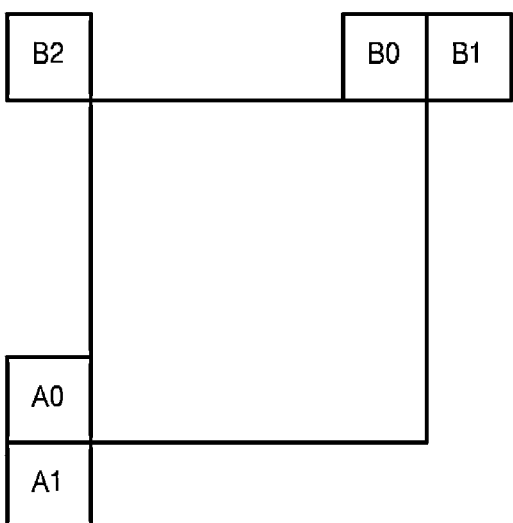
FIG. 4 illustrates neighboring blocks of a current block.

As a neighboring block for deriving the merge candidate, all or some of a left block A0, a bottom left block A1, a top block B0, a top right block B1, and a top left block B2 adjacent to the current block in the current picture may be used as illustrated in FIG. 4. Further, a block positioned within the reference picture (may be the same as or different from the reference picture used for predicting the current block) other than the current picture at which the current block is positioned may also be used as the merge candidate. For example, a co-located block with the current block within the reference picture or blocks adjacent to the co-located block may be additionally used as the merge candidate. If the number of merge candidates selected by the method described above is smaller than a preset number, a zero vector is added to the merge candidate.

The inter predictor 124 configures a merge list including a predetermined number of merge candidates by using the neighboring blocks. A merge candidate to be used as the motion information of the current block is selected from the merge candidates included in the merge list, and merge index information for identifying the selected candidate is generated. The generated merge index information is encoded by the entropy encoder 155 and delivered to the video decoding apparatus.

A merge skip mode is an example of the merge mode. After quantization, when all transform coefficients for entropy encoding are close to zero, only the neighboring block selection information is transmitted without transmitting residual signals. By using the merge skip mode, it is possible to achieve a relatively high encoding efficiency for images with slight motion, still images, screen content images, and the like.

Hereinafter, the merge mode and the merge skip mode are collectively referred to as the merge/skip mode.

Another method for encoding the motion information is an advanced motion vector prediction (AMVP) mode.

In the AMVP mode, the inter predictor 124 derives motion vector predictor candidates for the motion vector of the current block by using the neighboring blocks of the current block. As a neighboring block used for deriving the motion vector predictor candidates, all or some of a left block A0, a bottom left block A1, a top block B0, a top right block B1, and a top left block B2 adjacent to the current block in the current picture illustrated in FIG. 4 may be used. Further, a block positioned within the reference picture (may be the same as or different from the reference picture used for predicting the current block) other than the current picture at which the current block is positioned may also be used as the neighboring block used for deriving the motion vector predictor candidates. For example, a co-located block with the current block within the reference picture or blocks adjacent to the co-located block may be used. If the number of motion vector candidates selected by the method described above is smaller than a preset number, a zero vector is added to the motion vector candidate.

The inter predictor 124 derives the motion vector predictor candidates by using the motion vector of the neighboring blocks and determines motion vector predictor for the motion vector of the current block by using the motion vector predictor candidates. In addition, a motion vector difference is calculated by subtracting motion vector predictor from the motion vector of the current block.

The motion vector predictor may be obtained by applying a pre-defined function (e.g., center value and average value computation, and the like) to the motion vector predictor candidates. In this example, the video decoding apparatus also knows the pre-defined function. Further, since the neighboring block used for deriving the motion vector predictor candidate is a block in which encoding and decoding are already completed, the video decoding apparatus may also already know the motion vector of the neighboring block. Therefore, the video encoding apparatus does not need to encode information for identifying the motion vector predictor candidate. Accordingly, in this example, information on the motion vector difference and information on the reference picture used for predicting the current block are encoded.

The motion vector predictor may also be determined by a scheme of selecting any one of the motion vector predictor candidates. In this example, information for identifying the selected motion vector predictor candidate is additional encoded jointly with the information on the motion vector difference and the information on the reference picture used for predicting the current block.

The subtractor 130 generates a residual block by subtracting the prediction block generated by the intra predictor 122 or the inter predictor 124 from the current block.

The transformer 140 transforms residual signals in a residual block having pixel values of a spatial domain into transform coefficients of a frequency domain. The transformer 140 may transform residual signals in the residual block by using a total size of the residual block as a transform unit or also split the residual block into a plurality of subblocks and may perform the transform by using the subblock as the transform unit. Alternatively, the residual block is divided into two subblocks, which are a transform area and a non-transform area, to transform the residual signals by using only the transform area subblock as the transform unit. The transform area subblock may be one of two rectangular blocks having a size ratio of 1:1 based on a horizontal axis (or vertical axis). In this example, a flag (cu_sbt_flag) indicates that only the subblock is transformed, and directional (vertical/horizontal) information (cu_sbt_horizontal_flag) and/or positional information (cu_sbt_pos_flag) are encoded by the entropy encoder 155 and signaled to the video decoding apparatus. Further, a size of the transform area subblock may have a size ratio of 1:3 based on the horizontal axis (or vertical axis). In this example, a flag (cu_sbt_quad_flag) dividing the corresponding splitting is additionally encoded by the entropy encoder 155 and signaled to the video decoding apparatus.

The transformer 140 may perform the transform for the residual block individually in a horizontal direction and a vertical direction. For the transform, various types of transform functions or transform matrices may be used. For example, a pair of transform functions for horizontal transform and vertical transform may be defined as a multiple transform set (MTS). The transformer 140 may select one transform function pair having highest transform efficiency in the MTS and may transform the residual block in each of the horizontal and vertical directions. Information (mts_idx) on the transform function pair in the MTS is encoded by the entropy encoder 155 and signaled to the video decoding apparatus.

The quantizer 145 quantizes the transform coefficients output from the transformer 140 using a quantization parameter and outputs the quantized transform coefficients to the entropy encoder 155. The quantizer 145 may also immediately quantize the related residual block without the transform for any block or frame. The quantizer 145 may also apply different quantization coefficients (scaling values) according to positions of the transform coefficients in the transform block. A quantization matrix applied to quantized transform coefficients arranged in 2 dimensional may be encoded and signaled to the video decoding apparatus.

The rearrangement unit 150 may perform realignment of coefficient values for quantized residual values.

The rearrangement unit 150 may change a two-dimensional (2D) coefficient array to a one-dimensional (1D) coefficient sequence by using coefficient scanning. For example, the rearrangement unit 150 may output the 1D coefficient sequence by scanning a DC coefficient to a high-frequency domain coefficient by using a zig-zag scan or a diagonal scan. According to the size of the transform unit and the intra prediction mode, vertical scan of scanning a 2D coefficient array in a column direction and horizontal scan of scanning a 2D block type coefficient in a row direction may also be used instead of the zig-zag scan. In other words, according to the size of the transform unit and the intra prediction mode, a scan method to be used may be determined among the zig-zag scan, the diagonal scan, the vertical scan, and the horizontal scan.

The entropy encoder 155 generates a bitstream by encoding a sequence of 1D quantized transform coefficients output from the rearrangement unit 150 by using various encoding schemes including a Context-based Adaptive Binary Arithmetic Code (CABAC), an Exponential Golomb, or the like.

Further, the entropy encoder 155 encodes information such as a CTU size, a CTU split flag, a QT split flag, an MTT split type, an MTT split direction, and the like, related to the block splitting to allow the video decoding apparatus to split the block equally to the video encoding apparatus. Further, the entropy encoder 155 encodes information on a prediction type indicating whether the current block is encoded by intra prediction or inter prediction. The entropy encoder 155 encodes intra prediction information (i.e., information on an intra prediction mode) or inter prediction information (with regard to the merge mode, a merge index and with regard to the AMVP mode, information on the reference picture index and the motion vector difference) according to the prediction type. Further, the entropy encoder 155 encodes information related to quantization, i.e., information on the quantization parameter and information on the quantization matrix.

The inverse quantizer 160 dequantizes the quantized transform coefficients output from the quantizer 145 to generate the transform coefficients. The inverse transformer

165 transforms the transform coefficients output from the inverse quantizer 160 into a spatial domain from a frequency domain to reconstruct the residual block.

The adder 170 adds the reconstructed residual block and the prediction block generated by the predictor 120 to reconstruct the current block. Pixels in the reconstructed current block may be used as reference pixels when intra-predicting a next-order block.

The loop filter unit 180 performs filtering for the reconstructed pixels in order to reduce blocking artifacts, ringing artifacts, blurring artifacts, and the like, which occur due to block based prediction and transform/quantization. The loop filter unit 180 as an in-loop filter may include all or some of a deblocking filter 182, a sample adaptive offset (SAO) filter 184, and an adaptive loop filter (ALF) 186.

The deblocking filter 182 filters a boundary between the reconstructed blocks in order to remove a blocking artifact, which occurs due to block unit encoding/decoding, and the SAO filter 184 and the ALF 186 perform additional filtering for a deblocked filtered video. The SAO filter 184 and the ALF 186 are filters used for compensating differences between the reconstructed pixels and original pixels, which occur due to lossy coding. The SAO filter 184 applies an offset as a CTU unit to enhance a subjective image quality and encoding efficiency. On the other hand, the ALF 186 performs block unit filtering and compensates distortion by applying different filters by dividing a boundary of the corresponding block and a degree of a change amount. Information on filter coefficients to be used for the ALF may be encoded and signaled to the video decoding apparatus.

The reconstructed block filtered through the deblocking filter 182, the SAO filter 184, and the ALF 186 is stored in the memory 190. When all blocks in one picture are reconstructed, the reconstructed picture may be used as a reference picture for inter predicting a block within a picture to be encoded afterwards.

Figure 5:
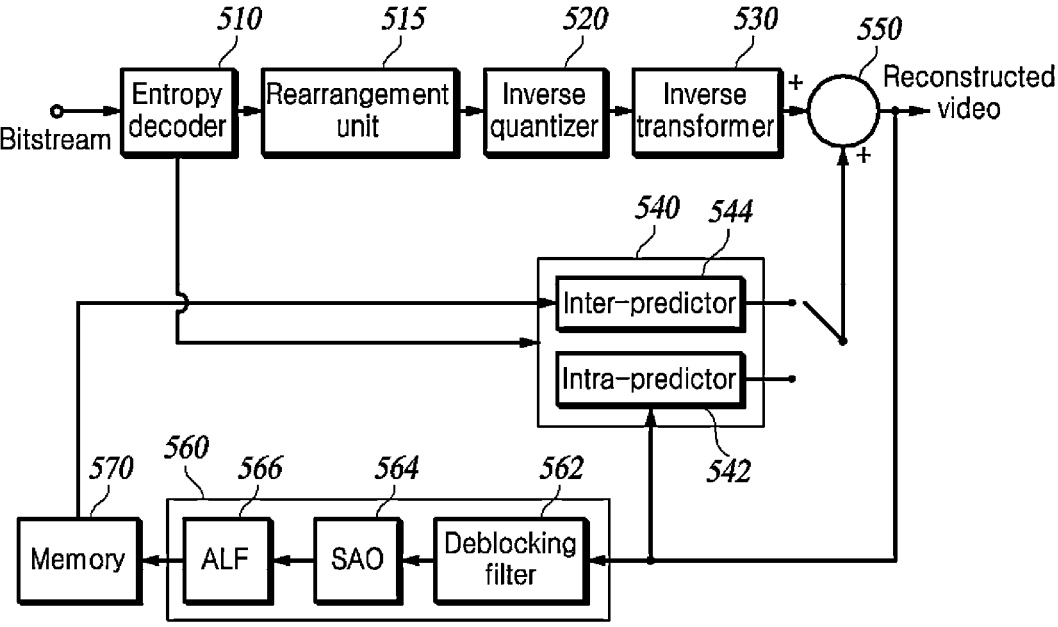
FIG. 5 is a block diagram of a video decoding apparatus that may implement technologies of the present disclosure.

FIG. 5 is a functional block diagram of a video decoding apparatus according to an embodiment of the present disclosure. The video encoding apparatus may implement technologies or methods according to one or more embodiments of the present disclosure. Hereinafter, referring to FIG. 5, the video decoding apparatus and components of the apparatus are described.

The video decoding apparatus may include an entropy decoder 510, a rearrangement unit 515, an inverse quantizer 520, an inverse transformer 530, a predictor 540, an adder 550, a loop filter unit 560, and a memory 570.

Similar to the video encoding apparatus of FIG. 1, each component of the video decoding apparatus may be implemented as hardware or software or implemented as a combination of hardware and software. Further, a function of each component may be implemented as the software, and a microprocessor may also be implemented to execute the function of the software corresponding to each component.

The entropy decoder 510 extracts information related to block splitting by decoding the bitstream generated by the video encoding apparatus to determine a current block to be decoded and extracts prediction information required for restoring the current block and information on the residual signals.

The entropy decoder 510 determines the size of the CTU by extracting information on the CTU size from a sequence parameter set (SPS) or a picture parameter set (PPS) and splits the picture into CTUs having the determined size. In addition, the CTU is determined as a highest layer of the tree structure, i.e., a root node, and split information for the CTU may be extracted to split the CTU by using the tree structure.

For example, when the CTU is split by using the QTBTTT structure, a first flag (QT_split_flag) related to splitting of the QT is first extracted to split each node into four nodes of the lower layer. In addition, a second flag (mtt_split_flag), a split direction (vertical/horizontal), and/or a split type (binary/ternary) related to splitting of the MTT are extracted with respect to the node corresponding to the leaf node of the QT to split the corresponding leaf node into an MTT structure. As a result, each of the nodes below the leaf node of the QT is recursively split into the BT or TT structure.

As another example, when the CTU is split by using the QTBTTT structure, a CU split flag (split_cu_flag) indicating whether the CU is split is extracted. When the corresponding block is split, the first flag (QT_split_flag) may also be extracted. During a splitting process, with respect to each node, recursive MTT splitting of 0 times or more may occur after recursive QT splitting of 0 times or more. For example, with respect to the CTU, the MTT splitting may immediately occur or on the contrary, only QT splitting of multiple times may also occur.

As another example, when the CTU is split by using the QTBT structure, the first flag (QT_split_flag) related to the splitting of the QT is extracted to split each node into four nodes of the lower layer. In addition, a split flag (split_flag) indicating whether the node corresponding to the leaf node of the QT is further split into the BT, and split direction information are extracted.

When the entropy decoder 510 determines a current block to be decoded by using the splitting of the tree structure, the entropy decoder 510 extracts information on a prediction type indicating whether the current block is intra predicted or inter predicted. When the prediction type information indicates the intra prediction, the entropy decoder 510 extracts a syntax element for intra prediction information (intra prediction mode) of the current block. When the prediction type information indicates the inter prediction, the entropy decoder 510 extracts information representing a syntax element for inter prediction information, i.e., a motion vector and a reference picture to which the motion vector refers.

Further, the entropy decoder 510 extracts quantization related information and extracts information on the quantized transform coefficients of the current block as the information on the residual signals.

The rearrangement unit 515 may change a sequence of 1D quantized transform coefficients entropy-decoded by the entropy decoder 510 to a 2D coefficient array (i.e., block) again in a reverse order to the coefficient scanning order performed by the video encoding apparatus.

The inverse quantizer 520 dequantizes the quantized transform coefficients and dequantizes the quantized transform coefficients by using the quantization parameter. The inverse quantizer 520 may also apply different quantization coefficients (scaling values) to the quantized transform coefficients arranged in 2D. The inverse quantizer 520 may perform dequantization by applying a matrix of the quantization coefficients (scaling values) from the video encoding apparatus to a 2D array of the quantized transform coefficients.

The inverse transformer 530 generates the residual block for the current block by restoring the residual signals by inversely transforming the dequantized transform coefficients into the spatial domain from the frequency domain.

Further, when the inverse transformer 530 inversely transforms a partial area (subblock) of the transform block, the inverse transformer 530 extracts a flag (cu_sbt_flag) that only the subblock of the transform block is transformed, directional (vertical/horizontal) information (cu_sbt_horizontal_flag) of the subblock, and/or positional information (cu_sbt_pos_flag) of the subblock. The inverse transformer 530 also inversely transforms the transform coefficients of the corresponding subblock into the spatial domain from the frequency domain to reconstruct the residual signals and fills an area, which is not inversely transformed, with a value of "0" as the residual signals to generate a final residual block for the current block.

Further, when the MTS is applied, the inverse transformer 530 determines the transform index or the transform matrix to be applied in each of the horizontal and vertical directions by using the MTS information (mts_idx) signaled from the video encoding apparatus. The inverse transformer 530 also performs inverse transform for the transform coefficients in the transform block in the horizontal and vertical directions by using the determined transform function.

The predictor 540 may include an intra predictor 542 and an inter predictor 544. The intra predictor 542 is activated when the prediction type of the current block is the intra prediction, and the inter predictor 544 is activated when the prediction type of the current block is the inter prediction.

The intra predictor 542 determines the intra prediction mode of the current block among the plurality of intra prediction modes from the syntax element for the intra prediction mode extracted from the entropy decoder 510. The intra predictor 542 also predicts the current block by using neighboring reference pixels of the current block according to the intra prediction mode.

The inter predictor 544 determines the motion vector of the current block and the reference picture to which the motion vector refers by using the syntax element for the inter prediction mode extracted from the entropy decoder 510.

The adder 550 reconstructs the current block by adding the residual block output from the inverse transformer 530 and the prediction block output from the inter predictor 544 or the intra predictor 542. Pixels within the reconstructed current block are used as a reference pixel upon intra predicting a block to be decoded afterwards.

The loop filter unit 560 as an in-loop filter may include a deblocking filter 562, an SAO filter 564, and an ALF 566. The deblocking filter 562 performs deblocking filtering a boundary between the reconstructed blocks in order to remove the blocking artifact, which occurs due to block unit decoding. The SAO filter 564 and the ALF 566 perform additional filtering for the reconstructed block after the deblocking filtering in order to compensate differences between the reconstructed pixels and original pixels, which occur due to lossy coding. The filter coefficients of the ALF are determined by using information on filter coefficients decoded from the bitstream.

The reconstructed block filtered through the deblocking filter 562, the SAO filter 564, and the ALF 566 is stored in the memory 570. When all blocks in one picture are reconstructed, the reconstructed picture may be used as a reference picture for inter predicting a block within a picture to be encoded afterwards.

Figure 6:
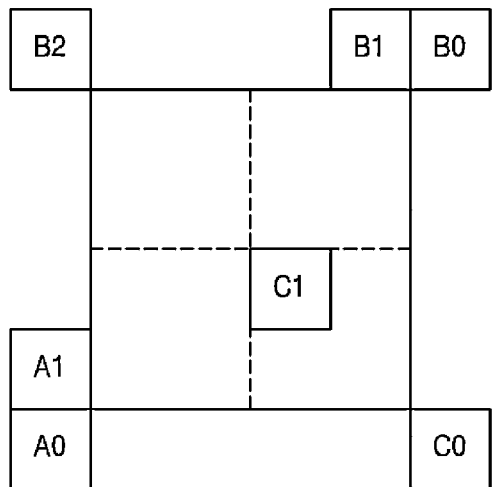
FIG. 6 is a diagram illustrating the location of blocks in the spatial and temporal neighborhood of a current block, according to an embodiment of the present disclosure.

FIG. 6 is a diagram illustrating the location of blocks in the spatial and temporal neighborhood of a current block, according to an embodiment of the present disclosure. Inter-frame prediction may be synonymous with inter prediction. In inter prediction, a merging candidate list is composed, and among the organized candidates, a particular candidate may have its motion information indicated by a transmitted index and used as the motion information of the current block. The motion information may be used to perform motion compensation. The merging candidate list may be composed, in the stated order, of spatial merging candidates, temporal merging candidates, history-based merging candidates, pairwise average merging candidates, and zero-motion vector merging candidates. The maximum number of candidates in the merging candidate list may be derived from information transmitted in the Sequence Parameter Set (SPS). The merging candidate list may be composed by using up to six candidates. However, the present disclosure is not limited to these embodiments and may compose such list by any number of merging candidates. As to the derivation method of the spatial merging candidates, the neighboring blocks of the current block may be searched in a predetermined order. The derivation method may add information on the blocks that are available as the merging candidates to the merging candidate list sequentially.

The spatial merging candidates may be up to four merging candidates that are derived from the five neighboring blocks of the current block. At most four merging candidates may be added to the merging candidate list. However, if the neighboring blocks are in a different prediction mode than the current block, such as intra-prediction mode, intra block copy (IBC) mode, or palette mode, the information from the neighboring blocks may not be added to the merging candidate list. If the neighboring block exists within another parallel merging region or has the same motion information as that of the previous neighboring block, the neighboring block's information may not be added to the merging candidate list.

Referring to FIG. 6, the current block may have neighboring blocks A0, A1, B0, B1, and B2. To derive spatial merging candidates, the neighboring blocks may be searched in the order of block B1, block A1, block B0, block A0, and block B2. Among the information items on the neighboring blocks searched in that order, the information items that may be used as a merging candidate may be sequentially added to the merging candidate list. At most four merging candidates may be derived from blocks A0, A1, B0, B1, and B2 and added to the merging candidate list. The temporal merging candidates may be selected with information on either block C0 or block C1 relative to the same position as the current block. If no motion information exists in the C0 block that may be used as a temporal merging candidate, the C1 block may be further searched.

Figure 7:
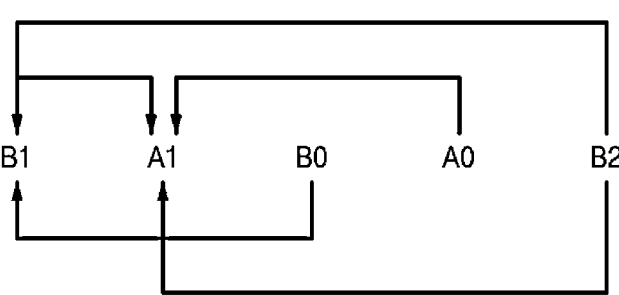
FIG. 7 is a diagram illustrating a redundancy check of spatial merging candidates, according to an embodiment of the present disclosure.

FIG. 7 is a diagram illustrating a redundancy check of spatial merging candidates, according to an embodiment of the present disclosure. A redundancy check may be performed to determine if there is overlapping motion information between information in the merging candidate list and information in the spatial merging candidate. With the redundancy check, merging candidates with the same motion information may not be added again to the merging candidate list. To reduce the complexity of the redundancy check, the redundancy check may not be performed for all spatial merging candidates.

Referring to FIG. 7, A0, A1, B0, B1, B2 spatial merging candidates may be derived from the blocks A0, A1, B0, B1, and B2, respectively, which are neighboring blocks of the current block. A redundancy check may not be performed on all of the A0, A1, B0, B1, B2 spatial merging candidates. The redundancy check might be performed on B1, A1 spatial merging candidates and B1, B0 spatial merging candidates and B1, B2 spatial merging candidates. The redundancy check may be performed on A1, A0 spatial merging candidates and A1, B2 spatial merging candidates. However, the present disclosure is not limited to these embodiments and other combinations of spatial merging candidates may be used to perform the redundancy check.

Figure 8:
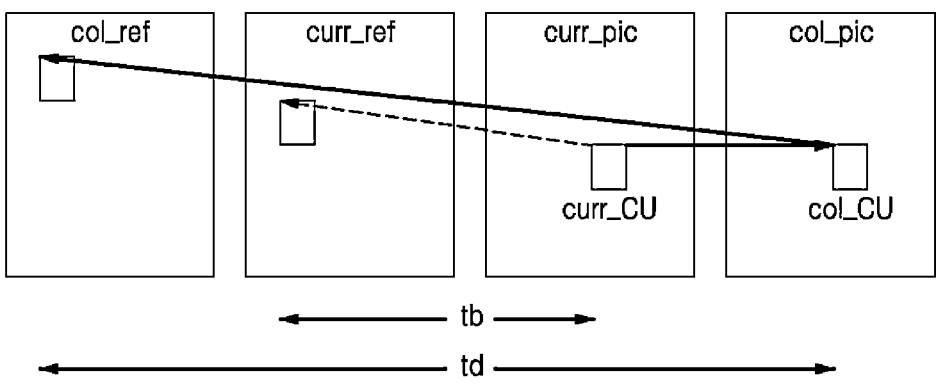
FIG. 8 is a diagram illustrating motion vector scaling for a temporal merging candidate, according to an embodiment of the present disclosure.

FIG. 8 is a diagram illustrating motion vector scaling for a temporal merging candidate, according to an embodiment of the present disclosure. The temporal merging candidate may be derived as at most one merging candidate from a temporal neighboring block. The temporal merging candidate may be derived by scaling the motion information of the temporal neighboring block. The scaling is performed to impart a distance between the current picture and its reference picture to a motion vector which spans over a distance between the reference picture holding the temporal neighboring block and a reference picture that is indicated by the motion information of the temporal neighboring block may be scaled to have a distance between the current picture and the reference picture of the current picture. The indicator information indicating the reference picture holding the temporal neighboring block and the indicator information indicating the orientation of the reference picture list of the reference picture holding the temporal neighboring block may be derived from the picture header and the slice header.

Referring to FIG. 8, td may represent the distance between a reference picture (col_pic) holding a temporal neighboring block (col_CU) and a reference picture (col_ref) indicated by the temporal neighboring block (col_CU). tb may represent the distance between the current picture (curr_pic) holding the current block (curr_CU) and a reference picture (curr_ref) of the current picture (curr_pic). A motion vector having distance td may be scaled to have distance tb.

Figure 9:
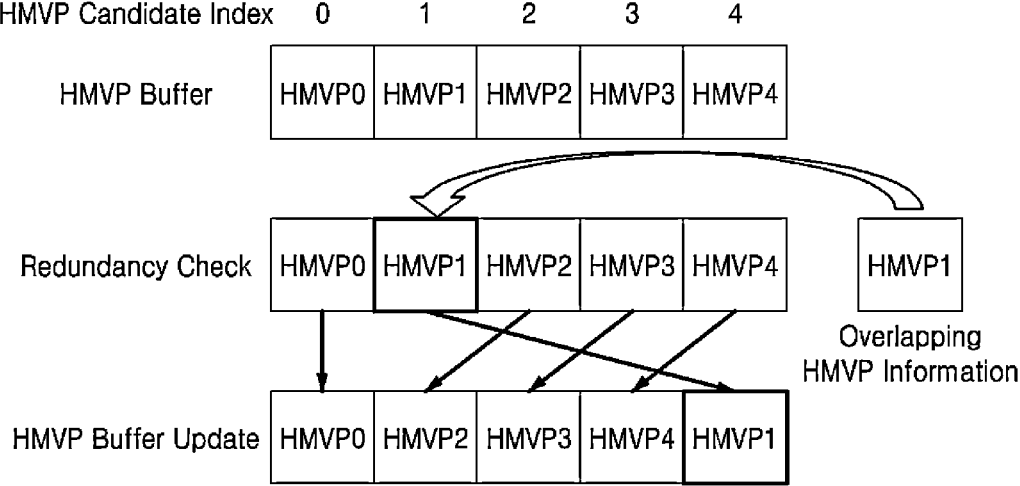
FIG. 9 is a diagram illustrating a management process for a buffer of history-based motion vector prediction candidates, according to an embodiment of the present disclosure.

FIG. 9 is a diagram illustrating a management process for a buffer of history-based motion vector prediction candidates, according to an embodiment of the present disclosure. A derivation method of history-based merging candidates (History-based Motion Vector Prediction or HMVP candidates) may be classified as a method of composing a merging candidate list by using motion information of previously encoded blocks. To manage the motion information of encoded blocks, a table-like buffer may be maintained constantly during encoding and decoding. The buffer of history-based motion vector prediction candidates may be initialized for each Coding Tree Unit (CTU) line for parallelization. The size of the buffer of history-based motion vector prediction candidates may be defined as 5. Up to five history-based motion vector prediction candidates may be organized in a table.

When a new history-based motion vector prediction candidate is added to the buffer, the buffer may be managed in a first-in-first-out (FIFO) method. The presence or absence of duplicate motion information may be checked between the motion information to be added to the buffer of the history-based motion vector prediction candidates and the motion information already in the buffer. If there is no duplicate motion information, the first inputted motion information is removed from the buffer and the new motion information may be added. If there is duplicate motion information, the duplicate motion information in the buffer may be moved to the first input position in the buffer or moved first-in. The remainder of the motion information in the buffer may be shifted so that the motion information in the buffer is reorganized.

Referring to FIG. 9, the buffer of history-based motion vector prediction candidates may be composed of HMVP0, HMVP1, HMVP2, HMVP3, and HMVP4. The HMVP0, HMVP1, HMVP2, HMVP3, and HMVP4 may be assigned indices 0, 1, 2, 3, and 4, respectively. The motion information HMVP1 to be added to the buffer of the history-based motion vector prediction candidates may be checked for duplicate motion information in the buffer. The motion information HMVP1 to be added may be duplicated by motion information HMVP1 assigned index 1 in the buffer. The duplicate motion information HMVP1 may be moved to the first position in the buffer, which is the position assigned index 4. The motion information HMVP2, HMVP3, and HMVP4 may be shifted. A history-based motion vector prediction candidate may be added to the merging candidate list. A redundancy check may be performed between the history-based motion vector prediction candidate and the merging candidates in the merging candidate list. To reduce the complexity of the redundancy check, a redundancy check may be performed exclusively between the candidates with indices 3 and 4 among the history-based motion vector prediction candidates and the two spatial merging candidates in the merging candidate list. However, the present disclosure is not limited to such embodiments. The history-based motion vector prediction candidates may be allowed to fill the merging candidate lists up to the maximum allowed number of merging candidate lists minus one. For example, if the maximum number of merging candidate lists is 6, then history-based motion vector prediction candidates may fill up the merging candidate lists at most 5 of them. However, the present disclosure is not limited to this particular embodiment.

Figure 10:
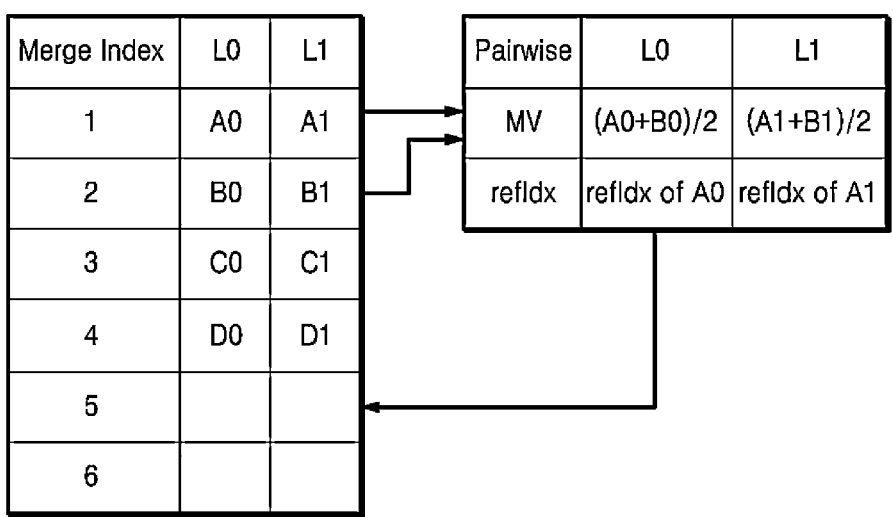
FIG. 10 is a diagram illustrating a method of generating pairwise average merging candidates, according to an embodiment of the present disclosure.

FIG. 10 is a diagram illustrating a method of generating pairwise average merging candidates, according to an embodiment of the present disclosure. The pairwise average merging candidate may refer to motion information generated by averaging the motion vectors of candidate pairs present in the merging candidate list. The pairwise average merging candidate may fill up the merging candidate list if it is not fulfilled with spatial merging candidates, temporal merging candidates, and history-based motion vector prediction candidates. The pairwise average merging candidate may be generated by averaging the motion information for the directions of the candidates in pairs. If two motion information items exist for each direction, the motion information may be generated by averaging the two motion information items. If only one motion information item is present, the motion information may just be used.

Referring to FIG. 10, both the merging candidate list in the L0 direction and the merging candidate list in the L1 direction may not be fulfilled. In the merging candidate list in the L0 direction, the first merging candidate A0 and the second merging candidate B0 may be averaged to generate a pairwise average merging candidate. The pairwise average merging candidate may be added to the merging candidate list in the L0 direction. In the merging candidate list in the L1 direction, the first merging candidate A1 and the second merging candidate B1 may be averaged to generate a pairwise average merging candidate. The pairwise average merging candidate may be added to the merging candidate list in the L1 direction.

Figure 11:
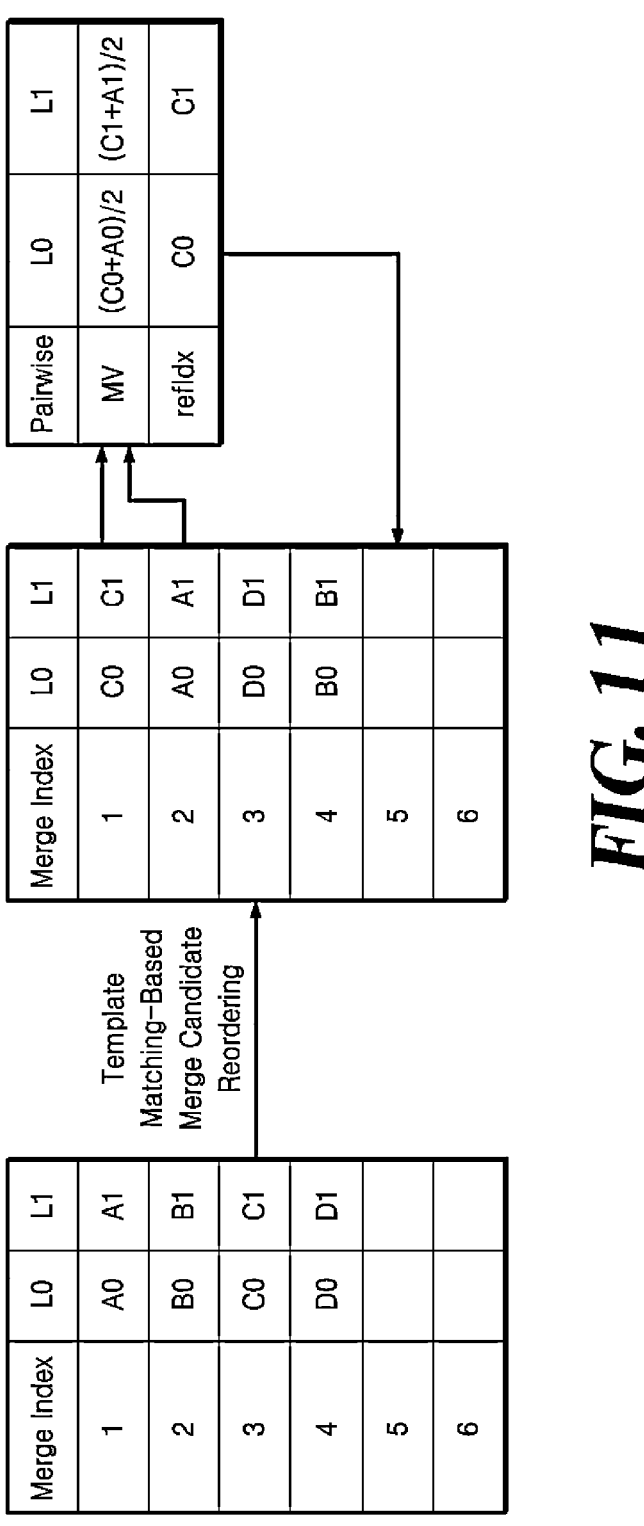
FIG. 11 is a diagram illustrating a method of generating pairwise average merging candidates, according to another embodiment of the present disclosure.

FIG. 11 is a diagram illustrating a method of generating pairwise average merging candidates, according to another embodiment of the present disclosure. Using template matching, the positions of merging candidates within a merging candidate list may be variably reordered. By performing template matching on the merging candidates in the merging candidate list, a cost value for each merging candidate may be calculated. Using these cost values, the merging candidates in the merging candidate list may be reordered. In this case, the merging candidate list may be divided into several subgroups to account for complexity. Template matching may be performed on the merging candidates in each subgroup. Based on this, a reordering of the merging candidates may be performed by units of subgroups.

Referring to FIG. 11, in the merging candidate list in the L0 direction, the first merging candidate may be A0, the second merging candidate may be B0, the third merging candidate may be C0, and the fourth merging candidate may be D0. In the merging candidate list in the L1 direction, the first merging candidate may be A1, the second merging candidate may be B1, the third merging candidate may be C1, and the fourth merging candidate may be D1. Template matching may be performed on the merging candidates in the merging candidate list in the L0 direction and the merging candidates in the merging candidate list in the L1 direction. A cost value may be calculated for each merging candidate in the merging candidate list in the L0 direction, and a cost value may be calculated for each merging candidate in the merging candidate list in the L1 direction. Using these cost values, the merging candidates may be reordered in the merging candidate list in the L0 direction, and the merging candidates may be reordered in the merging candidate list in the L1 direction.

In the merging candidate list in the L0 direction after reordering, the first merging candidate may be C0, the second merging candidate may be A0, the third merging candidate may be D0, and the fourth merging candidate may be B0. In the merging candidate list in the L1 direction after reordering, the first merging candidate may be C1, the second merging candidate may be A1, the third merging candidate may be D1, and the fourth merging candidate may be B1. In the merging candidate list in the L0 direction after reordering, the first merging candidate C0 and the second merging candidate A0 may be averaged to generate a pairwise average merging candidate. In the merging candidate list in the L1 direction after reordering, the first merging candidate C1 and the second merging candidate A1 may be averaged to generate a pairwise average merging candidate. The reference picture may be determined as the reference picture of the first merging candidate.

For example, in the merging candidate list in the L0 direction after reordering, a pairwise average merging candidate may be generated by weighted summing the first merging candidate C0 and the second merging candidate A0. This equation may be expressed as $MV_{L0}=w_{L0}1 \times C0+w_{L0}2 \times A0$. $w_{L0}1$ and $w_{L0}2$ are normalized values and may be any value between 0 and 1. For example, in the merging candidate list in the L1 direction after reordering, the pairwise average merging candidate may be generated by weighted summing the first merging candidate C1 and the second merging candidate A1. This equation may be expressed as $MV_{L1}=w_{L1}1 \times C1+w_{L1}2 \times A1$. $w_{L1}1$ and $w_{L1}2$ are normalized values and may be any value between 0 and 1. If merging candidates from the reordered merging candidate list are used to generate a pairwise average merging candidate by using template matching, the accuracy of the motion information can be improved, which can increase coding efficiency.

Figure 12:
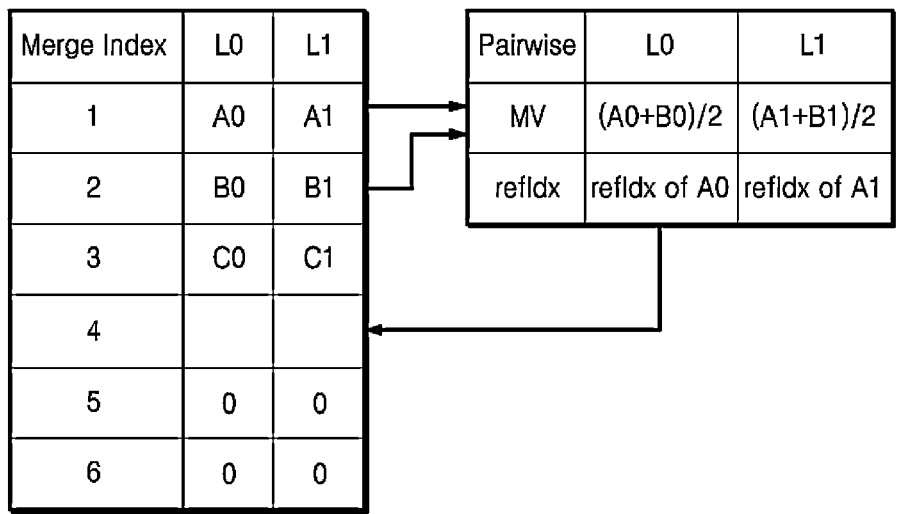
FIG. 12 is a diagram illustrating a method of generating zero-motion vector merging candidates, according to an embodiment of the present disclosure.

FIG. 12 is a diagram illustrating a method of generating zero-motion vector merging candidates, according to an embodiment of the present disclosure. The zero-motion vector merging candidate may fill a merging candidate list if it is not fulfilled with spatial merging candidates, temporal merging candidates, history-based motion vector prediction candidates, and pairwise average merging candidates. A zero motion vector merging candidate may have a motion vector of zero.

Referring to FIG. 12, pairwise average merging candidates may be generated to fill the merging candidate list in the L0 direction and the merging candidate list in the L1 direction with candidates up to the fourth merge index. Since the merging candidate list is not fulfilled with pairwise average merging candidates, a zero-motion vector merging candidate may be added to the merging candidate list. The zero-motion vector merging candidate may be fulfilled at the fifth merging index and the sixth merging index in the merging candidate list in the L0 direction and the merging candidate list in the L1 direction.

Figure 13:
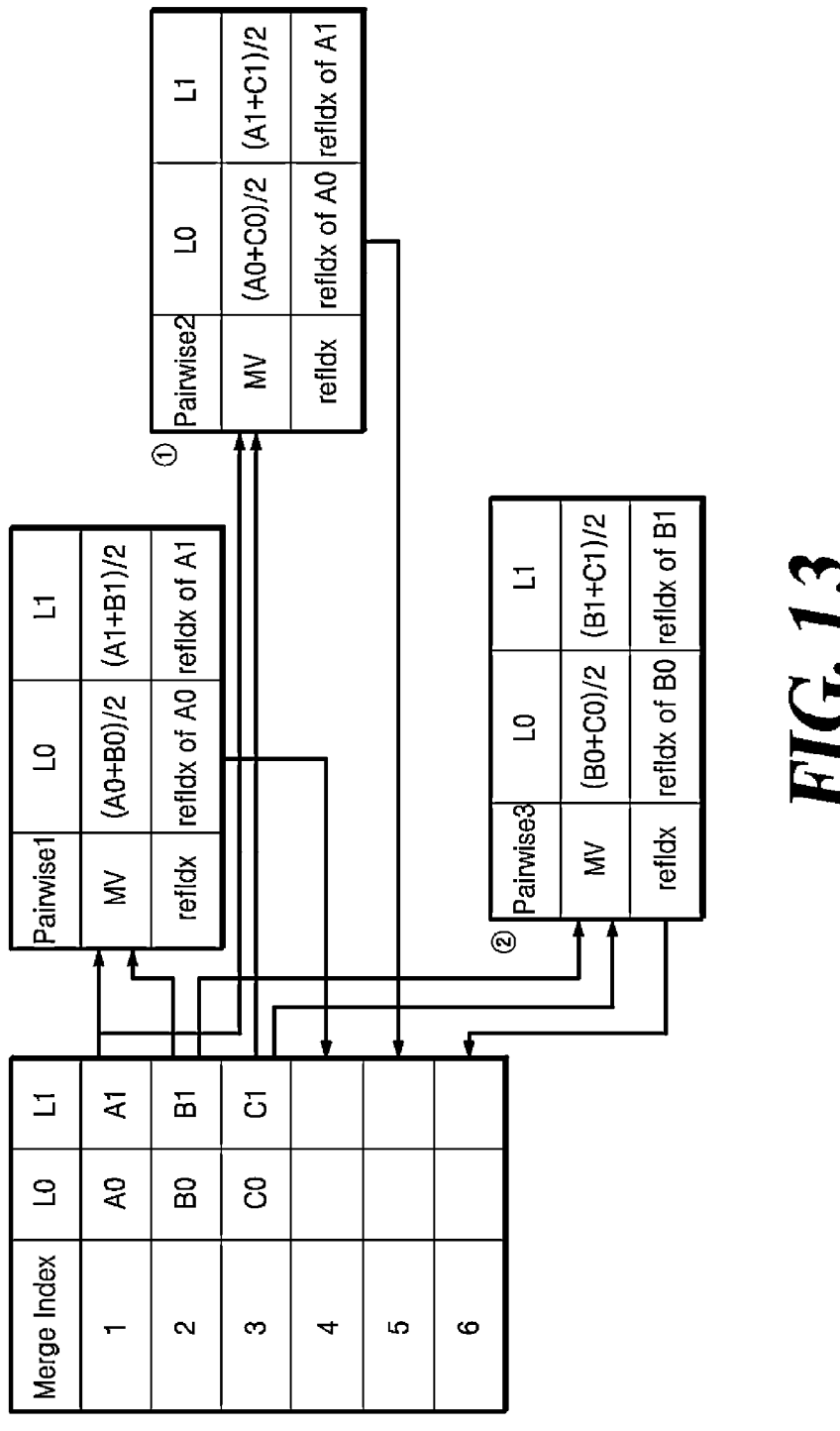
FIG. 13 is a diagram illustrating a method of limiting the number of zero-motion vector merging candidates, according to an embodiment of the present disclosure.

FIG. 13 is a diagram illustrating a method of limiting the number of zero-motion vector merging candidates, according to an embodiment of the present disclosure. If a large number of zero-motion vector merging candidates are added to the merging candidate list, the coding efficiency of the merge mode may be reduced. When the number of pairwise average merging candidates is increased and added to the merging candidate list, the number of zero-motion vector merging candidates in the merging candidate list may be limited.

Referring to FIG. 13, pairwise average merging candidates may be generated to fill the merging candidate list in the L0 direction and the merging candidate list in the L1 direction with candidates up to the fourth merging index, fifth merging index, and the sixth merging index. When using pairwise average merging candidates to fulfill the merging candidate list, a redundancy check is performed and only pairwise average merging candidates with non-duplicate motion information may be added to the merging candidate list. When generating pairwise average merging candidates, only spatial merging candidates may be used as combinable merging candidates. When generating pairwise average merging candidates, any merging candidates may be used as combinable merging candidates.

A pairwise average merging candidate may be generated by averaging or weighted summing the first merging candidate A0 and the second merging candidate B0 in the merging candidate list in the L0 direction. The pairwise average merging candidate may be added to the fourth merge index of the merging candidate list in the L0 direction. A pairwise average merging candidate may be generated by averaging or weight summing the first merging candidate A0 and the third merging candidate C0 in the merging candidate list in the L0 direction. The pairwise average merging candidate may be added to the fifth merge index of the merging candidate list in the L0 direction. A pairwise average merging candidate may be generated by averaging or weight summing the second merging candidate B0 and the third merging candidate C0 in the merging candidate list in the L0 direction. The pairwise average merging candidate may be added to the sixth merge index of the merging candidate list in the L0 direction. No zero-motion vector merging candidates may be added because the merging candidates in the merging candidate list in the L0 direction are full.

A pairwise average merging candidate may be generated by averaging or weight summing the first merging candidate A1 and the second merging candidate B1 in the merging candidate list in the L1 direction. The pairwise average merging candidate may be added to the fourth merge index of the merging candidate list in the L1 direction. A pairwise average merging candidate may be generated by averaging or weight summing the first merging candidate A1 and the third merging candidate C1 in the merging candidate list in the L1 direction. The pairwise average merging candidate may be added to the fifth merge index of the merging candidate list in the L1 direction. A pairwise average merging candidate may be generated by averaging or weight summing the second merging candidate B1 and the third merging candidate C1 in the merging candidate list in the L1 direction. The pairwise average merging candidate may be added to the sixth merge index of the merging candidate list in the L1 direction. No zero-motion vector merging candidate may be added because the merging candidates in the merging candidate list in the L1 direction are full.

For example, when generating pairwise average merging candidates, two merging candidates may be selected in a random order other than the merging candidate with the earlier merging index. The merging candidates selected may be limited to spatial merging candidates only. The merging candidate selection may be limited to spatial merging candidates and history-based motion vector prediction candidates only. Any merging candidates may be the selected merging candidates.

Figure 14:
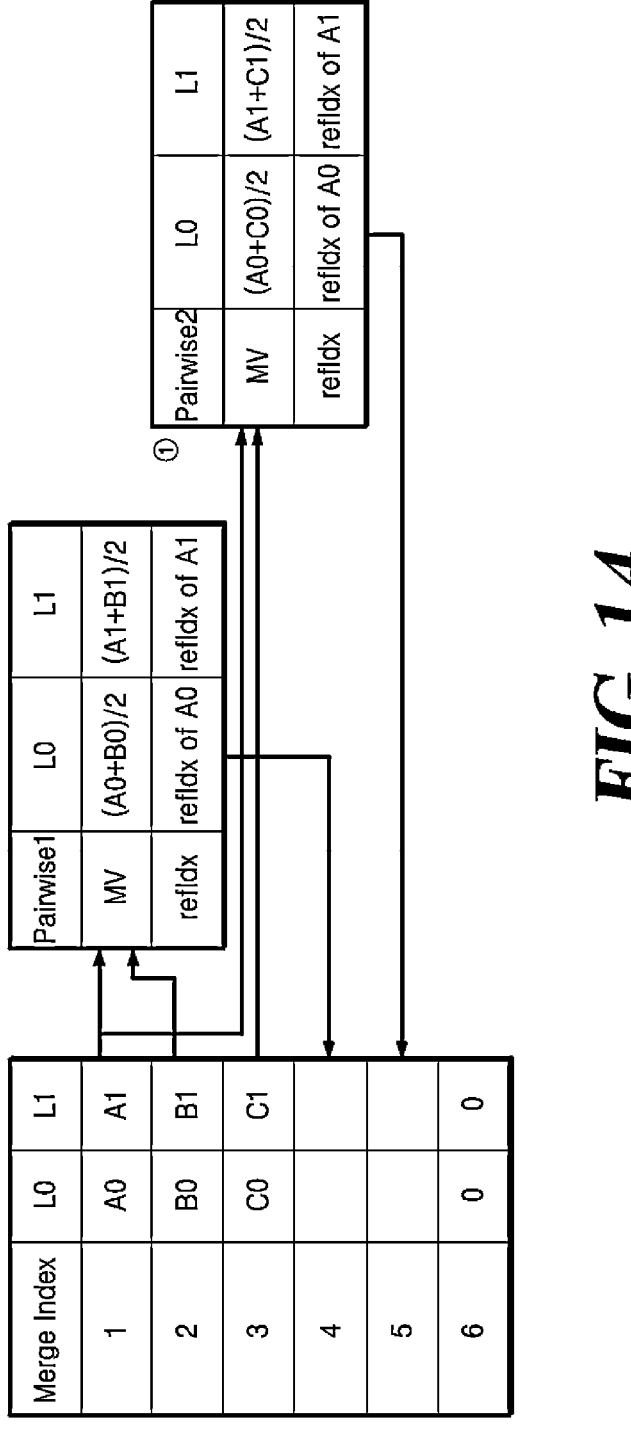
FIG. 14 is a diagram illustrating a method of limiting the number of zero-motion vector merging candidates to one, according to an embodiment of the present disclosure.

FIG. 14 is a diagram illustrating a method of limiting the number of zero-motion vector merging candidates to one, according to an embodiment of the present disclosure.

Referring to FIG. 14, pairwise average merging candidates may be generated to fill the merging candidate list in the L0 direction and the merging candidate list in the L1 direction with candidates up to the fourth merging index and the fifth merging index. When filling the merging candidate list with the pairwise average merging candidates, only pairwise average merging candidates with redundancy checks and non-duplicate motion information may be added to the merging candidate list.

A pairwise average merging candidate may be generated by averaging or weighted summing the first merging candidate A0 and the second merging candidate B0 in the merging candidate list in the L0 direction. The pairwise average merging candidate may be added to the fourth merge index of the merging candidate list in the L0 direction. A pairwise average merging candidate may be generated by averaging or weight summing the first merging candidate A0 and the third merging candidate C0 in the merging candidate list in the L0 direction. The pairwise average merging candidate may be added to the fifth merge index of the merging candidate list in the L0 direction. A zero-motion vector merging candidate may be generated. The zero-motion vector merging candidate may be added to the sixth merge index of the merging candidate list in the L0 direction. The number of zero-motion vector merging candidates in the merging candidate list in the L0 direction may be limited to one.

A pairwise average merging candidate may be generated by averaging or weight summing the first merging candidate A1 and the second merging candidate B1 in the merging candidate list in the L1 direction. The pairwise average merging candidate may be added to the fourth merge index of the merging candidate list in the L1 direction. A pairwise average merging candidate may be generated by averaging or weight summing the first merging candidate A1 and the third merging candidate C1 in the merging candidate list in the L1 direction. The pairwise average merging candidate may be added to the fifth merge index of the merging candidate list in the L1 direction. Zero-motion vector merging candidates may be generated. These zero-motion vector merging candidates may be added to the sixth merge index of the merging candidate list in the L1 direction. The number of zero-motion vector merging candidates in the merging candidate list in the L1 direction may be limited to one. In one example, the number of zero-motion vector merging candidates in the merging candidate list may be limited to any number of zero-motion vector merging candidates other than one.

FIG. 15 is a diagram illustrating a method of generating pairwise average merging candidates, according to yet another embodiment of the present disclosure.

Referring to FIG. 15, in a merging candidate list in the L0 direction, a first merging candidate may be A0, a second merging candidate may be B0, and a third merging candidate may be C0. In the merging candidate list in the L1 direction, the first merging candidate may be A1, the second merging candidate may be B1, and the third merging candidate may be C1. Template matching may be performed on the merging candidates in the merging candidate list in the L0 direction and the merging candidates in the merging candidate list in the L1 direction. A cost value may be calculated for each merging candidate in the merging candidate list in the L0 direction and a cost value for each merging candidate in the merging candidate list in the L1 direction. These cost values may be used to reorder the merging candidates in the merging candidate list in the L0 direction and the merging candidates in the merging candidate list in the L1 direction.

In the merging candidate list in the L0 direction after reordering, the first merging candidate may be C0, the second merging candidate may be A0, and the third merging candidate may be B0. In the merging candidate list in the L1 direction after reordering, the first merging candidate may be C1, the second merging candidate may be A1, and the third merging candidate may be B1. In the merging candidate list in the L0 direction after reordering, a pairwise average merging candidate may be generated by averaging or weight summing the first merging candidate C0 and the second merging candidate A0. The pairwise average merging candidate may be added to the fourth merge index of the merging candidate list in the L0 direction. In the merging candidate list in the L1 direction after reordering, a pairwise average merging candidate may be generated by averaging or weight summing the first merging candidate C1 and the second merging candidate A1. The pairwise average merging candidate may be added to the fourth merge index of the merging candidate list in the L1 direction.

In the merging candidate list in the L0 direction after reordering, a pairwise average merging candidate may be generated by averaging or weight summing the first merging candidate C0 and the third merging candidate B0. The pairwise average merging candidate may be added to the fifth merge index of the merging candidate list in the L0 direction. In the merging candidate list in the L1 direction after reordering, a pairwise average merging candidate may be generated by averaging or weight summing the first merging candidate C1 and the third merging candidate B1. The pairwise average merging candidate may be added to the fifth merge index of the merging candidate list in the L1 direction.

In the merging candidate list in the L0 direction after reordering, a pairwise average merging candidate may be generated by averaging or weight summing the second merging candidate A0 and the third merging candidate B0. The pairwise average merging candidate may be added to the sixth merge index of the merging candidate list in the L0 direction. In the merging candidate list in the L1 direction after the reordering, a pairwise average merging candidate may be generated by averaging or weight summing the second merging candidate A1 and the third merging candidate B1. The pairwise average merging candidate may be added to the sixth merge index of the merging candidate list in the L1 direction.

In one example, if the merging candidate list is not fulfilled after adding the pairwise average merging candidates to the reordered merging candidate list, a zero-motion vector merging candidate may be added to the merging candidate list. The pairwise average merging candidates generated by using combinatorial merging candidates may fulfill the merging candidate list. Alternatively, the pairwise average merging candidates may fulfill the merging candidate list variably, taking into account the number of zero-motion vector merging candidates. The number of zero-motion vector merging candidates may be random.

Figure 16:
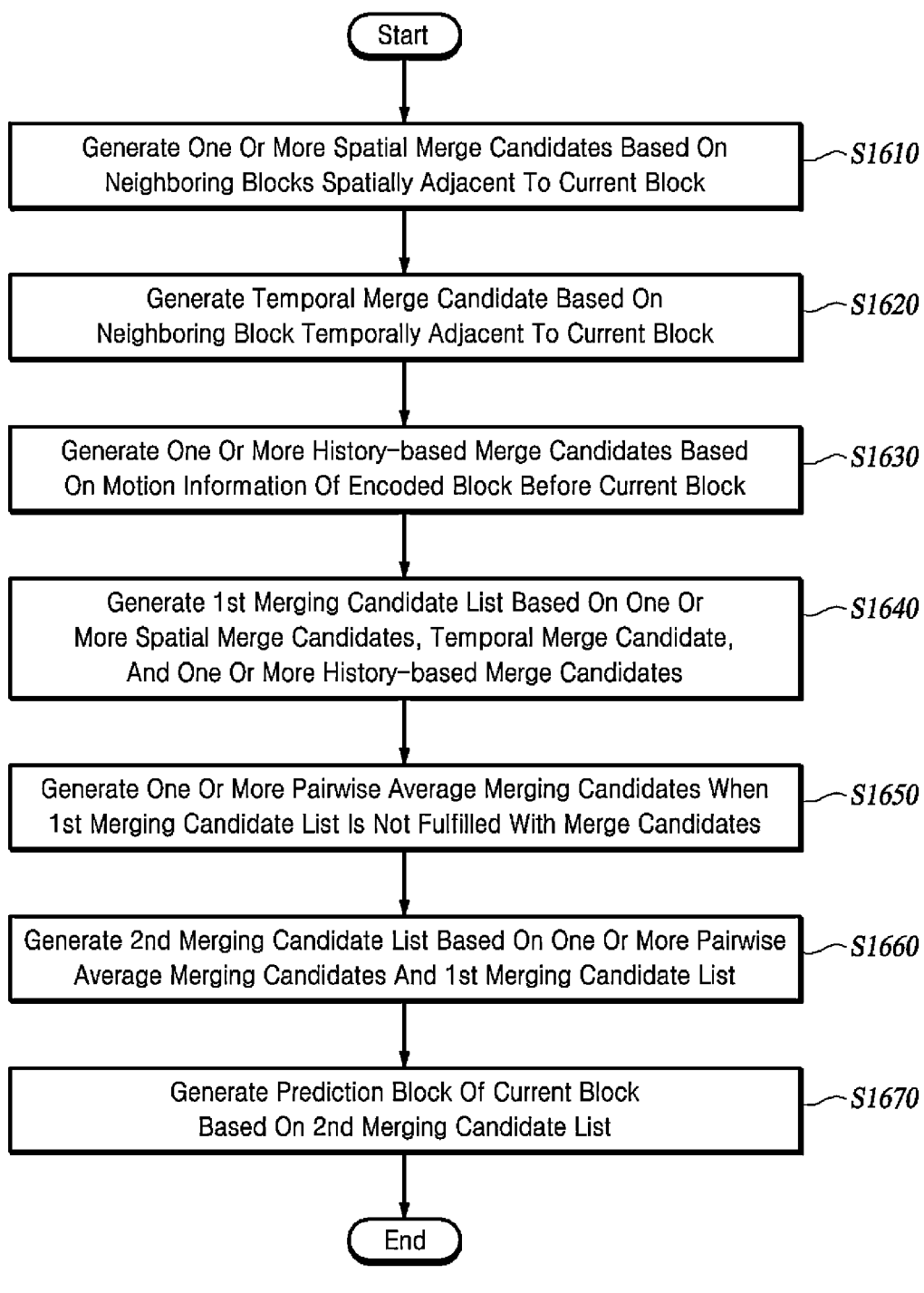
FIG. 16 is a flowchart illustrating a video decoding process, according to an embodiment of the present disclosure.

FIG. 16 is a flowchart illustrating a video decoding process, according to an embodiment of the present disclosure.

Referring to FIG. 16, the decoding apparatus may generate one or more spatial merging candidates based on neighboring blocks that are spatially adjacent to the current block (S1610). The decoding apparatus may generate a temporal merging candidate based on neighboring blocks that are temporally adjacent to the current block (S1620). The decoding apparatus may generate one or more history-based motion vector prediction candidates based on motion information of a block encoded before the current block (S1630). The decoding apparatus may generate a first merging candidate list based on the one or more spatial merging candidates, the temporal merging candidates, and the one or more history-based motion vector prediction candidates (S1640). The decoding apparatus may generate one or more pairwise average merging candidates if the first merging candidate list is not fulfilled with merging candidates (S1650).

The step of generating the one or more pairwise average merging candidates may include the steps of performing a template matching on one or more merging candidates in the first merging candidate list to calculate a cost value, and reordering, based on the cost value, the one or more merging candidates in the first merging candidate list, and generating a single pairwise average merging candidate by using a first merging candidate and a second merging candidate among reordered one or more merging candidates. The step of generating of the single pairwise average merging candidate may include the step of averaging or weight summing the first merging candidate and the second merging candidate to generate the single pairwise average merging candidate.

The step of generating the one or more pairwise average merging candidates may include selecting two merging candidates from the one or more merging candidates in the first merging candidate list and averaging or weight summing the two merging candidates to generate the one or more pairwise average merging candidates. The two merging candidates may be randomly selected.

The step of generating the one or more pairwise average merging candidates may include the steps of performing a template matching on one or more merging candidates in the first merging candidate list to calculate a cost value, and reordering, based on the cost value, the one or more merging candidates in the first merging candidate list, and selecting two merging candidates from reordered one or more merging candidates, and averaging or weight summing the two merging candidates to generate the one or more pairwise average merging candidates. The two merging candidates may be randomly selected.

The decoding apparatus may generate a second merging candidate list based on the one or more pairwise average merging candidates and the first merging candidate list (S1660). The step of generating the second merging candidate list may include the steps of filling up the first merging candidate list based on the one or more pairwise average merging candidates, generating a zero-motion vector merging candidate if the first merging candidate list is not fulfilled, and adding the zero-motion vector merging candidate to the first merging candidate list to generate the second merging candidate list. The decoding apparatus may generate a prediction block of the current block based on the second merging candidate list (S1670).

Figure 17:
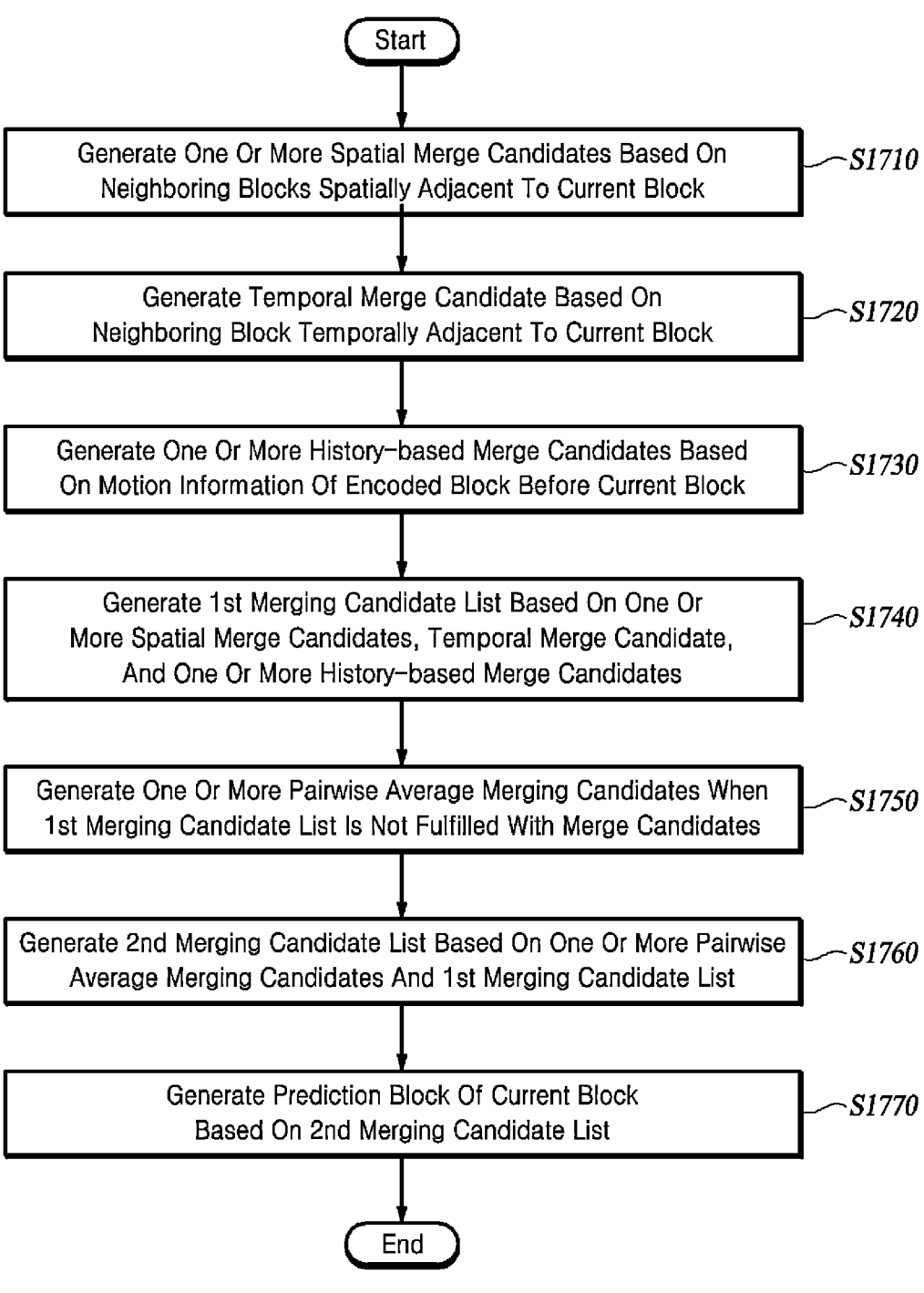
FIG. 17 is a flowchart illustrating a video encoding process, according to an embodiment of the present disclosure.

FIG. 17 is a flowchart illustrating a video encoding process, according to an embodiment of the present disclosure.

Referring to FIG. 17, the encoding apparatus may generate one or more spatial merging candidates based on neighboring blocks that are spatially adjacent to the current block (S1710). The encoding apparatus may generate a temporal merging candidate based on neighboring blocks that are temporally adjacent to the current block (S1720). The encoding apparatus may generate one or more history-based motion vector prediction candidates based on motion information of a block encoded before the current block (S1730). The encoding apparatus may generate a first merging candidate list based on the one or more spatial merging candidates, the temporal merging candidates, and the one or more history-based motion vector prediction candidates (S1740). The encoding apparatus may generate one or more pairwise average merging candidates if the first merging candidate list is not fulfilled with merging candidates (S1750).

The step of generating the one or more pairwise average merging candidates may include the steps of performing a template matching on one or more merging candidates in the first merging candidate list to calculate a cost value, and reordering, based on the cost value, the one or more merging candidates in the first merging candidate list, and generating a single pairwise average merging candidate by using a first merging candidate and a second merging candidate among reordered one or more merging candidates. The step of generating the single pairwise average merging candidates may include the step of averaging or weight summing the first merging candidate and the second merging candidate to generate the single pairwise average merging candidate.

The step of generating one or more pairwise average merging candidates may include the step of selecting two merging candidates from one or more merging candidates in the first merging candidate list and averaging or weight summing the two merging candidates to generate the one or more pairwise average merging candidates. The two merging candidates may be randomly selected.

The step of generating one or more pairwise average merging candidates may include the steps of performing a template matching on one or more merging candidates in the first merging candidate list to calculate a cost value, and reordering, based on the cost value, the one or more merging candidates in the first merging candidate list, and selecting two merging candidates from reordered one or more merging candidates and averaging or weight summing the two merging candidates to generate the one or more pairwise average merging candidates. The two merging candidates may be randomly selected.

The encoding apparatus may generate a second merging candidate list based on the one or more pairwise average merging candidates and the first merging candidate list (S1760). The step of generating the second merging candidate list may include the steps of filling up the first merging candidate list based on the one or more pairwise average merging candidates, generating a zero-motion vector merging candidate if the first merging candidate list is not fulfilled, and adding the zero-motion vector merging candidate to the first merging candidate list to generate the second merging candidate list. The encoding apparatus may generate a prediction block of the current block based on the second merging candidate list (S1770).

Although the steps in the respective flowcharts are described to be sequentially performed, the steps merely instantiate the technical idea of some embodiments of the present disclosure. Therefore, a person having ordinary skill in the art to which this disclosure pertains could perform the steps by changing the sequences described in the respective drawings or by performing two or more of the steps in parallel. Hence, the steps in the respective flowcharts are not limited to the illustrated chronological sequences.

It should be understood that the above description presents illustrative embodiments that may be implemented in various other manners. The functions described in some embodiments may be realized by hardware, software, firmware, and/or their combination. It should also be understood that the functional components described in this disclosure are labeled by " . . . unit" to strongly emphasize the possibility of their independent realization. When a component, unit, device, element, apparatus or the like of the present disclosure is described as having a purpose or performing an operation, function, or the like, the component, unit, device, element, apparatus, or the like should be considered herein as being "configured to" meet that purpose or to perform that operation or function. Each component, unit, device, element, apparatus, and the like may separately embody or be included with a processor and a memory, such as a non-transitory computer readable media, as part of the apparatus.

Various methods or functions described in some embodiments may be implemented as instructions stored in a non-transitory recording medium that can be read and executed by one or more processors. The non-transitory recording medium may include, for example, various types of recording devices in which data is stored in a form readable by a computer system. For example, the non-transitory recording medium may include storage media such as erasable programmable read-only memory (EPROM), flash drive, optical drive, magnetic hard drive, and solid state drive (SSD) among others.

Although embodiments of the present disclosure have been described for illustrative purposes, those having ordinary skill in the art to which this disclosure pertains should appreciate that various modifications, additions, and substitutions are possible, without departing from the idea and scope of the present disclosure. Therefore, embodiments of the present disclosure have been described for the sake of brevity and clarity. The scope of the technical idea of the embodiments of the present disclosure is not limited by the illustrations. Accordingly, those having ordinary skill in the art to which this disclosure pertains should understand that the scope of the present disclosure is not to be limited by the above explicitly described embodiments but by the claims and equivalents thereof.

REFERENCE NUMBER

122: intra predictor
510: entropy decoder
542: intra predictor

What is claimed is:

1. A method of decoding a video, the method comprising:
generating one or more spatial merging candidates based on neighboring blocks that are spatially adjacent to a current block;

generating a temporal merging candidate based on neighboring blocks that are temporally adjacent to the current block;
generating one or more history-based motion vector prediction candidates based on motion information of a block encoded before the current block;
generating a first merging candidate list based on the one or more spatial merging candidates, the temporal merging candidate, and the one or more history-based motion vector prediction candidates;
generating one or more pairwise average merging candidates when the first merging candidate list is not fulfilled with merging candidates;
generating a second merging candidate list based on the one or more pairwise average merging candidates and the first merging candidate list; and
generating a prediction block of the current block based on the second merging candidate list,
wherein generating the one or more pairwise average merging candidates comprises:
calculating cost values by performing a template matching on one or more merging candidates in the first merging candidate list;
reordering, based on the cost values, the one or more merging candidates in the first merging candidate list;
selecting two merging candidates from the reordered one or more merging candidates; and
generating the one or more pairwise average merging candidates by averaging or weight summing the two merging candidates,
wherein the two merging candidates are randomly selected.

2. The method of claim 1, wherein generating the one or more pairwise average merging candidates comprises:
calculating the cost values by performing the template matching on the one or more merging candidates in the first merging candidate list;
reordering, based on the cost values, the one or more merging candidates in the first merging candidate list; and
generating a single pairwise average merging candidate by using a first merging candidate and a second merging candidate among the reordered one or more merging candidates.

3. The method of claim 2, wherein generating the single pairwise average merging candidate comprises:
generating the single pairwise average merging candidate by averaging or weight summing the first merging candidate and the second merging candidate.

4. The method of claim 1, wherein generating the second merging candidate list comprises:
filling up the first merging candidate list based on the one or more pairwise average merging candidates;
generating a zero-motion vector merging candidate when the first merging candidate list is not fulfilled; and
generating the second merging candidate list by adding the zero-motion vector merging candidate to the first merging candidate list.

5. A method of encoding a video, the method comprising:
generating one or more spatial merging candidates based on neighboring blocks that are spatially adjacent to a current block;
generating a temporal merging candidate based on neighboring blocks that are temporally adjacent to the current block;

generating one or more history-based motion vector prediction candidates based on motion information of a block encoded before the current block;

generating a first merging candidate list based on the one or more spatial merging candidates, the temporal merging candidate, and the one or more history-based motion vector prediction candidates;

generating one or more pairwise average merging candidates when the first merging candidate list is not fulfilled with merging candidates;

generating a second merging candidate list based on the one or more pairwise average merging candidates and the first merging candidate list; and generating a prediction block of the current block based on the second merging candidate list, wherein generating the one or more pairwise average merging candidates comprises:

calculating cost values by performing a template matching on one or more merging candidates in the first merging candidate list;

reordering, based on the cost values, the one or more merging candidates in the first merging candidate list;

selecting two merging candidates from the reordered one or more merging candidates; and generating the one or more pairwise average merging candidates by averaging or weight summing the two merging candidates, wherein the two merging candidates are randomly selected.

6. The method of claim 5, wherein generating the one or more pairwise average merging candidates comprises:

calculating the cost values by performing the template matching on the one or more merging candidates in the first merging candidate list;

reordering, based on the cost values, the one or more merging candidates in the first merging candidate list; and generating a single pairwise average merging candidate by using a first merging candidate and a second merging candidate among the reordered one or more merging candidates.

7. The method of claim 6, wherein generating the single pairwise average merging candidate comprises:

generating the single pairwise average merging candidate by averaging or weight summing the first merging candidate and the second merging candidate.

8. The method of claim 5, wherein generating the second merging candidate list comprises:

filling up the first merging candidate list based on the one or more pairwise average merging candidates;

generating a zero-motion vector merging candidate when the first merging candidate list is not fulfilled; and generating the second merging candidate list by adding the zero-motion vector merging candidate to the first merging candidate list.

9. A method for transmitting a bitstream associated with video data, the method comprising:

generating the bitstream by encoding the video data; and transmitting the bitstream to a video decoding apparatus, wherein generating the bitstream comprises:

generating one or more spatial merging candidates based on neighboring blocks that are spatially adjacent to a current block;

generating a temporal merging candidate based on neighboring blocks that are temporally adjacent to the current block;

generating one or more history-based motion vector prediction candidates based on motion information of a block encoded before the current block;

generating a first merging candidate list based on the one or more spatial merging candidates, the temporal merging candidate, and the one or more history-based motion vector prediction candidates;

generating one or more pairwise average merging candidates when the first merging candidate list is not fulfilled with merging candidates;

generating a second merging candidate list based on the one or more pairwise average merging candidates and the first merging candidate list; and generating a prediction block of the current block based on the second merging candidate list, wherein generating the one or more pairwise average merging candidates comprises:

calculating cost values by performing a template matching on one or more merging candidates in the first merging candidate list;

reordering, based on the cost values, the one or more merging candidates in the first merging candidate list;

selecting two merging candidates from the reordered one or more merging candidates; and generating the one or more pairwise average merging candidates by averaging or weight summing the two merging candidates, wherein the two merging candidates are randomly selected.

* * * * *